US011260908B2

(12) United States Patent
Hirose et al.

(10) Patent No.: US 11,260,908 B2
(45) Date of Patent: Mar. 1, 2022

(54) STRUCTURAL MEMBER AND STRUCTURAL MEMBER FOR VEHICLE

(71) Applicant: Nippon Steel Corporation, Tokyo (JP)

(72) Inventors: Satoshi Hirose, Tokyo (JP); Yuichi Ishimori, Tokyo (JP); Hiroshi Fukuchi, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 355 days.

(21) Appl. No.: 16/467,589

(22) PCT Filed: Dec. 28, 2017

(86) PCT No.: PCT/JP2017/047316
§ 371 (c)(1),
(2) Date: Jun. 7, 2019

(87) PCT Pub. No.: WO2018/131516
PCT Pub. Date: Jul. 19, 2018

(65) Prior Publication Data
US 2020/0001924 A1 Jan. 2, 2020

(30) Foreign Application Priority Data
Jan. 11, 2017 (JP) .................................. 2017-002799

(51) Int. Cl.
*B60J 7/00* (2006.01)
*B62D 21/00* (2006.01)
(Continued)

(52) U.S. Cl.
CPC ............. *B62D 21/00* (2013.01); *B62D 21/15* (2013.01); *B60J 5/00* (2013.01); *B60R 19/02* (2013.01);
(Continued)

(58) Field of Classification Search
CPC ....... A61P 35/00; H04W 72/04; H04W 24/10; H04W 72/042; B32B 27/08; B60R 9/045;
(Continued)

(56) References Cited

U.S. PATENT DOCUMENTS 2,431,524 A * 11/1947 Lindsay ............. B62D 25/2036
296/204
6,971,691 B1 * 12/2005 Heatherington ........ B60R 19/18
293/102
(Continued)

FOREIGN PATENT DOCUMENTS

JP   H07119892 A    5/1995
JP   H07310156 A   11/1995
(Continued)

OTHER PUBLICATIONS

English Abstract & Family List of JP2010236560A.
(Continued)

*Primary Examiner* — Kiran B Patel
(74) *Attorney, Agent, or Firm* — Banner & Witcoff, Ltd.

(57) ABSTRACT

A structural member 10 includes a hat member 1 and a closing plate 2. The length LY of the tubular portion formed by the hat member 1 and the closing plate 2 is 6 or more times the height H of a pair of side walls 11 and 12. Each of the side walls 11 and 12 includes a high-strength portion 11A or 12A and low-strength portions 11B or 12B. The high-strength portion has a yield strength not less than 500 MPa. The low-strength portions have a yield strength of 60 to 85% of that of the high-strength portion. Each high-strength portion extends a distance not less than (⅔)H and not more than 3H as measured in the direction in which the ridges extend, and is provided such that the high-strength portions of the pair of side walls face each other. A pair of low-strength portions sandwich the associated high-strength portion.

19 Claims, 22 Drawing Sheets

(51) Int. Cl.
*B62D 21/15* (2006.01)
*B60J 5/00* (2006.01)
*B60R 19/02* (2006.01)
*B62D 25/02* (2006.01)
*B62D 25/04* (2006.01)
*B62D 25/06* (2006.01)
*B62D 25/20* (2006.01)
*F16F 7/12* (2006.01)

(52) U.S. Cl.
CPC ............ *B62D 25/025* (2013.01); *B62D 25/04* (2013.01); *B62D 25/06* (2013.01); *B62D 25/20* (2013.01); *F16F 7/12* (2013.01); *F16F 2224/0233* (2013.01)

(58) Field of Classification Search
CPC ........... B60R 9/12; B60P 3/08; G07B 15/063; B65G 69/003
See application file for complete search history.

(56) References Cited

U.S. PATENT DOCUMENTS

| | | | |
|---|---|---|---|
| 6,986,536 B1 * | 1/2006 | Heatherington | B60R 19/03 293/102 |
| 2010/0084892 A1 | 4/2010 | Yoshida et al. | |
| 2012/0152675 A1 | 6/2012 | Mori | |
| 2017/0113729 A1 * | 4/2017 | Onishi | B62D 25/2036 |
| 2019/0367098 A1 * | 12/2019 | Miyake | B62D 25/025 |

FOREIGN PATENT DOCUMENTS

| | | |
|---|---|---|
| JP | 2004114912 A | 4/2004 |
| JP | 2004182189 A | 7/2004 |
| JP | 2007126093 A | 5/2007 |
| JP | 2010236560 A | 10/2010 |
| JP | 5137322 B2 | 2/2013 |
| JP | 2013052871 A | 3/2013 |
| JP | 2014024074 A | 2/2014 |
| JP | 2017001601 A | 1/2017 |
| KR | 10-2012-0091394 A | 8/2012 |
| WO | 2005058624 A1 | 6/2005 |

OTHER PUBLICATIONS

English Abstract & Family List of JP2014024074A.
English Abstract & Family List of JPB005137322.
English Abstract & Family List of JPH07119892A.
English Abstract & Family List of JP2004114912A.
English Abstract & Family List of WO2005058624A1.
English Abstract & Family List of JP2013052871A.
English Abstract & Family List of JP2017001601A.
English Abstract & Family List of JP2004182189A.
English Abstract & Family List of JPH07310156A.
English Abstract & Family List of JP2007126093A.

\* cited by examiner

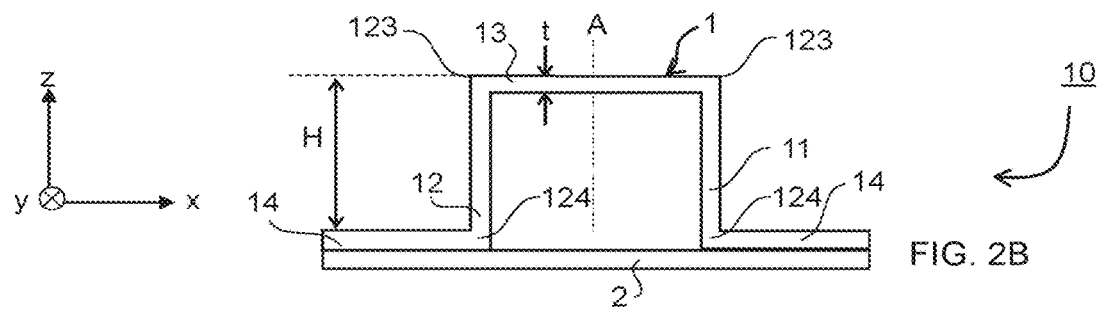
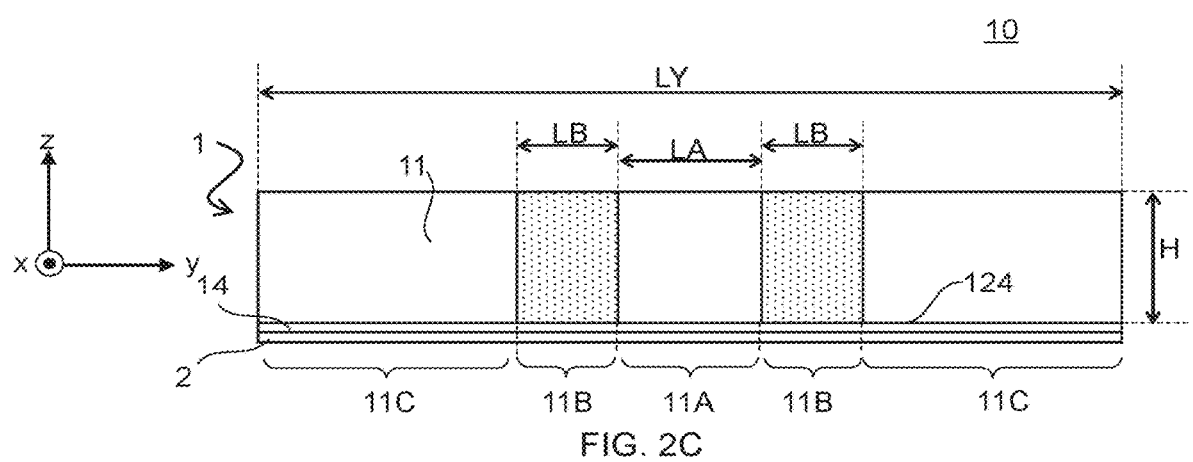

US 11,260,908 B2

STRUCTURAL MEMBER AND STRUCTURAL MEMBER FOR VEHICLE

RELATED APPLICATION DATA

This application is a National Stage Application under 35 U.S.C. 371 of PCT application number PCT/JP2017/047316 designating the United States and filed Dec. 28, 2017; which claims the benefit of JP application number 2017-002799 and filed Jan. 11, 2017 each of which are hereby incorporated by reference in their entireties.

TECHNICAL FIELD

The present invention relates to an impact-resistant structural member and a structural member for a vehicle using such a member.

BACKGROUND ART

Structural members including a tubular portion composed of a hat member having a hat-shaped cross section and a closing plate joined to the hat member are used in various applications. Applications include structural members in vehicles, buildings, or large containers, for example. Especially structural members used in automobiles are required to have impact resistance.

For example, WO 2005/058624 (Patent Document 1) discloses a metal pipe mounted on the vehicle body of an automobile with both ends supported thereon to provide impact resistance. This metal pipe has a bent portion that runs its entire length or just a portion of its length. The metal pipe is disposed such that the outer side of the bent portion is generally oriented toward the direction of a possible impact applied to the vehicle body. This metal pipe has better impact resistance than a reinforcement member made of straight pipe to reinforce the vehicle body.

PRIOR ART DOCUMENTS

Patent Documents

Patent Document 1: WO 2005/058624

SUMMARY OF THE INVENTION

Problems to be Solved by the Invention

When a structural member having a tubular portion receives an impact exceeding its yield strength, it is bent sharply such that the sharply bent portion protrudes. As the wall thickness of this structural member is reduced to reduce weight, an extent of protrusion occurring when the member is sharply bent by an impact tends to increase. For example, in the structural member used in an automobile, it is preferable to reduce the extent of inward protrusion occurring when the member receives impact from outside the vehicle. Thus, there are cases where the extent of protrusion of a portion of the structural member deformed by impact from a collision is required to be small.

In view of this, the present application discloses a structural member that protrudes to a reduced extent when it is deformed by impact, and a structural member for a vehicle using such a member.

Means for Solving the Problems

A structural member according to an aspect of the present invention includes at least one closing plate and a hat member. The hat member includes a top portion, two first ridges located on both edges of the top portion, two flanges joined to the closing plate, two second ridges located on edges of the two flanges, and two side walls each located between one of the two first ridges and one of the two second ridges. A length of a tubular portion formed by the hat member and the closing plate as measured in a direction in which the first ridges extend is 6 or more times a larger one H of dimensions of the two side walls as measured in a direction perpendicular to the top portion. Each of the two side walls includes a high-strength portion and low-strength portions. The high-strength portions of the two side walls face each other and each high-strength portion extends a distance not less than ⅔ times the dimension H and not more than 3 times the dimension H as measured in the direction in which the first ridges extend. The high-strength portion has a yield strength not less than 500 MPa. The low-strength portions sandwich the high-strength portion as determined along the direction in which the first ridges extend. The low-strength portions have a yield strength of 60 to 85% of that of the high-strength portion.

Effects of the Invention

The present disclosure provides a structural member that protrudes to a reduced extent when it is deformed by an impact, and a structural member for a vehicle using such a member.

BRIEF DESCRIPTION OF THE DRAWINGS

FIG. 2B is a side view of the structural member of FIG. 2A as viewed in the y-direction.

FIG. 2C is a side view of the structural member of FIG. 2A as viewed in the x-direction.

EMBODIMENTS FOR CARRYING OUT THE INVENTION

Figure 1A:
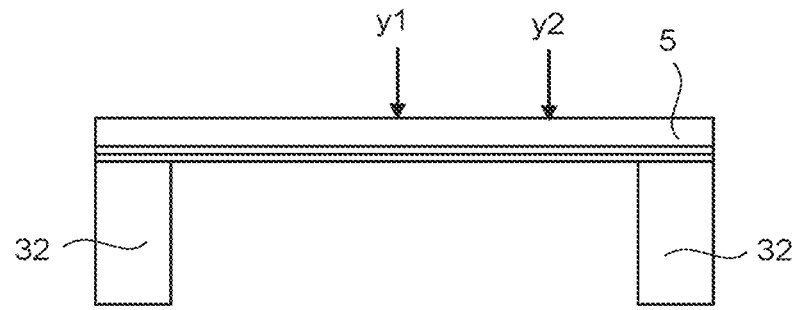
FIG. 1A shows an exemplary construction of a structural member with its both ends supported.

The inventors investigated a behavior of a structural member having a tubular portion with a member with a hat-shaped cross section (hereinafter referred to as hat member) and a closing plate joined to the hat member, against an impact. For example, as shown in FIG. 1A, the structural member 5 extends in the longitudinal direction of the tubular portion. The structural member 5 often constitutes part of a structure (for example, a vehicle, a building or a container) whose both ends as determined along the longitudinal direction of the tubular portion are supported. In view of this, the inventors examined the behavior of a structural member with supported ends against an impact. They found that the extent of deformation caused by an impact may become significant when the longitudinal dimension (or length) of the tubular portion of the structural member is about six or more times the dimension of the structural member as measured in the direction in which an impact is applied.

Figure 1B:
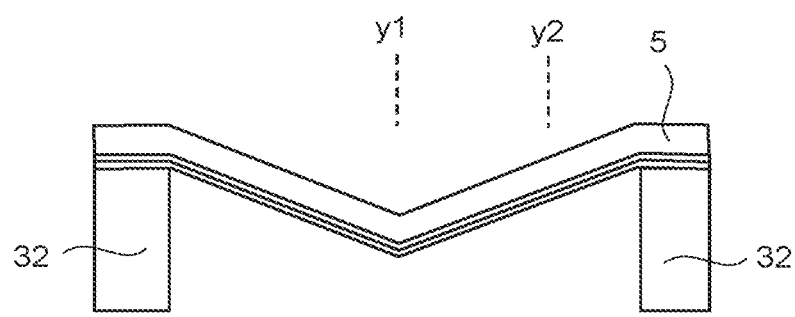
FIG. 1B shows an exemplary deformation behavior of the structural member of FIG. 1A.

For example, when an impact is applied to the middle (y1 in FIG. 1A), as determined along the longitudinal direction, of the structural member 5 with its both ends supported by two supports 32, the structural member 5 is deformed and sharply bent early after the application of the impact (see FIG. 1B). The structural member 5 is also deformed when an impact has been applied to a position (y2 in FIG. 1A) between the middle of the structural member 5 along the longitudinal direction and one support 32 (see FIG. 1C). The extent of protrusion of an early sharp bend found when an impact is applied to the middle of the structural member 5 along the longitudinal direction (y1) is larger than that found when an impact is applied to y2. An analysis demonstrated that the load of a moment is highest when an impact is applied to the middle, along the longitudinal direction, of the structural member 5 with its both ends supported.

The inventors did research to reduce the extent of deformation of the structural member caused by an impact by increasing the strength of the structural member. However, it is difficult to reduce the extent of protrusion associated with deformation by increasing the strength of the structural member. This is because, although increasing the strength of the structural member makes it less likely that the member is deformed by an impact, if the member is deformed by an impact, the extent of deformation remains substantially the same. In view of this, the inventors did further research to prevent sharp bending by changing the strength distribution in the structural member.

The inventors extensively investigated the material strength of and strength distribution in a structural member, and arrived at an arrangement in which each side wall of the structural member has low-strength portions with a lower strength than other portions, the low-strength portions being arranged in the longitudinal direction. That is, the inventors arrived at an arrangement in which low-strength portions with a lower strength than a high-strength portion are disposed to sandwich the high-strength portion. In other words, they arrived at an arrangement in which a high-strength portion is sandwiched by low-strength portions as determined along the longitudinal direction of the structural member. The inventors found that, in this arrangement, a load derived from an impact applied to the high-strength portion is transmitted to the low-strength portions to prevent sharp-bend deformation. Then, after further trials and errors, the inventors found that the extent of deformation caused by an impact against the high-strength portion can be effectively reduced by optimizing the strength of the high-strength portion, the strength ratio of the low-strength portions to the high-strength portion, and the longitudinal dimension of the high-strength portion. Based on these findings, the inventors arrived at the structural members of the embodiments described below.

(Construction 1)

The structural member of Construction 1 of the embodiments of the present invention includes at least one closing plate and a hat member. The hat member includes a top portion, two first ridges located on both edges of the top portion, two flanges joined to the closing plate, two second ridges located on edges of the two flanges, and two side walls each located between one of the two first ridges and one of the two second ridges. A length of a tubular portion formed by the hat member and the closing plate as measured in a direction in which the first ridges extend is 6 or more times a larger one H of dimensions of the two side walls as measured in a direction perpendicular to the top portion. Each of the two side walls includes a high-strength portion and low-strength portions. The high-strength portions of the two side walls face each other and each high-strength portion extends a distance not less than ⅔ times the dimension H and not more than 3 times the dimension H as measured in the direction in which the first ridges extend. The high-strength portion has a yield strength not less than 500 MPa. The low-strength portions sandwich the high-strength portion as determined along the direction in which the first ridges extend. The low-strength portions have a yield strength of 60 to 85% of that of the high-strength portion.

In Construction 1, the dimension H of the side walls as measured in a direction perpendicular to the top portion is the larger one of the dimensions of the side walls defined as the distance between the first and second ridges as measured in the direction perpendicular to the top portion. The two flanges extend from the second ridges away from each other. The direction perpendicular to the top portion is the direction perpendicular to the surface of the top portion, i.e. the direction perpendicular to the top surface. The structural member of Construction 1 is deformed to a smaller extent by an impact applied to the top portion of the hat member.

(Construction 2)

The structural member of Construction 2 of the embodiments of the present invention includes at least one closing plate and a hat member. The hat member includes a top portion, two first ridges located on both edges of the top portion, two flanges joined to the closing plate, two second ridges located on edges of the two flanges, and two side walls each located between one of the two first ridges and one of the two second ridges. A length of a tubular portion formed by the hat member and the closing plate as measured in a direction in which the first ridges extend is 6 or more times a larger one H of dimensions of the two side walls as measured in a direction perpendicular to the closing plate. Each of the two side walls includes a high-strength portion and low-strength portions. The high-strength portions of the two side walls face each other and each high-strength portion extends a distance not less than $\tfrac{2}{3}$ times the dimension H and not more than 3 times the dimension H as measured in the direction in which the first ridges extend. The high-strength portion has a yield strength not less than 500 MPa. The low-strength portions sandwich the high-strength portion as determined along the direction in which the first ridges extend. The low-strength portions have a yield strength of 60 to 85% of that of the high-strength portion.

In Construction 2, the dimension H of the side walls as measured in a direction perpendicular to the closing plate is the larger one of the dimensions of the side walls defined as the distance between the first and second ridges as measured in the direction perpendicular to the closing plate. The two flanges extend from the second ridges away from each other. The direction perpendicular to the closing plate is the direction perpendicular to the surface of the closing plate. The structural member of Construction 2 is deformed to a smaller extent by an impact applied to the closing plate.

(Construction 3)

The structural member of Construction 3 of the embodiments of the present invention includes at least one closing plate and a grooved member. The grooved member includes a top portion, two first ridges located on both edges of the top portion, two joints joined to the closing plate, and two side walls each located between one of the two first ridges and one of the two joints. A length of a tubular portion formed by the grooved member and the closing plate as measured in a direction in which the first ridges extend is 6 or more times a larger one H of dimensions of the side walls as measured in a direction perpendicular to the top portion. Each of the two side walls includes a high-strength portion and low-strength portions. The high-strength portions of the two side walls face each other and each high-strength portion extends a distance not less than $\tfrac{2}{3}$ times the dimension H and not more than 3 times the dimension H as measured in the direction in which the first ridges extend. The high-strength portion has a yield strength not less than 500 MPa. The low-strength portions sandwich the high-strength portion as determined along the direction in which the first ridges extend. The low-strength portions have a yield strength of 60 to 85% of that of the high-strength portion.

In Construction 3, the dimension H of the side walls as measured in a direction perpendicular to the top portion is the larger one of the dimensions of the side walls defined as the distance between the first ridge and a joint line defined as a line connecting portions of the joint arranged in the direction in which the first ridges extend as measured in the direction perpendicular to the top portion. The structural member of Construction 3 is different from that of Construction 1 in that there is no flange. That is, the hat member of Construction 1 is replaced by a grooved member in Construction 3. Similar to the structural member of Construction 1, the structural member of Construction 3 is deformed to a smaller extent by an impact applied to the top portion of the grooved member.

(Construction 4)

The structural member of Construction 4 of the embodiments of the present invention includes at least one closing plate and a grooved member. The grooved member includes a single top portion, two first ridges located on both edges of the top portion, a flange joined to the closing plate, a single second ridge located on an edge of the flange, a first side wall located between one of the first ridges and the second ridge, a joint joined to the closing plate, and a second side wall located between the other first ridge and the joint. A length of a tubular portion formed by the grooved member and the closing plate as measured in a direction in which the first ridges extend is 6 or more times a larger one H of dimensions of the first and second side walls as measured in a direction perpendicular to the top portion. The first side wall includes a high-strength portion and low-strength portions. The high-strength portion of the first side wall faces the second side wall and extends a distance not less than $\tfrac{2}{3}$ times the dimension H and not more than 3 times the dimension H as measured in the direction in which the first ridge of the tubular portion extends. The high-strength portion has a yield strength not less than 500 MPa. The low-strength portions sandwich the high-strength portion as determined along the direction in which the first ridge extends. The low-strength portions have a yield strength of 60 to 85% of that of the high-strength portion. The second side wall includes a high-strength portion and low-strength portions. The high-strength portion of the second side wall faces the first side wall and extends a distance not less than $\tfrac{2}{3}$ times the dimension H and not more than 3 times the dimension H as measured in the direction in which the first ridge of the tubular portion extends. The high-strength portion has a yield strength not less than 500 MPa. The low-strength portions sandwich the high-strength portion as determined along the direction in which the first ridge extends. The low-strength portions have a yield strength of 60 to 85% of that of the high-strength portion.

In Construction 4, the dimension H is the larger one of the dimension of the first side wall defined as the distance between the first and second ridges as measured in the direction perpendicular to the top portion and the dimension of the second side wall defined as the distance between a joint line defined as a line connecting portions of the joint arranged in the direction in which the first ridge extends as measured in the direction perpendicular to the top portion.

The structural member of Construction 4 is a variation of Construction 3. The difference is that, while Construction 3 has no flange on any of the two edges of the grooved member, Construction 4 has a flange on one of the edges. Similar to the structural members of Constructions 1 and 3, the structural member of Construction 4 is deformed to a smaller extent by an impact applied to the top portion of the grooved member.

In Constructions 1 to 4, the deformation caused by the load from an impact against the high-strength portion can be dispersed to the low-strength portions at an early stage. This prevents the structural member from being sharply bent by the impact. In Constructions 1, 3 and 4, when an impact is applied to the top portion, the structural member can be further prevented. In Construction 2, when an impact is applied to the closing plate, the structural member can be further prevented from being deformed.

In Constructions 1 to 4, the dimension H is the height of the side walls. In Constructions 1, 3 and 4, the height direction of the side walls is defined as the direction perpendicular to the top portion. In Construction 2, the height direction of the side walls is defined as the direction perpendicular to the closing plate.

(Construction 5)

Construction 5 will now be described. Starting from any one of Constructions 1 to 4, a dimension of each of the low-strength portions as measured in the direction in which the first ridge extends is preferably not less than $3/5$ times the dimension H and not more than twice the dimension H. This will further reduce the extent of deformation of the structural member caused by an impact against the high-strength portion.

(Construction 6)

Construction 6 will now be described. Starting from any one of Constructions 1 to 5, the high-strength portion located between the low-strength portions is preferably positioned at a middle of the tubular portion as determined along the direction in which the first ridge extends. The moment of an input tends to be large at the middle of the tubular portion as determined along the direction in which the first ridge extends. Positioning a high-strength portion in the middle along the direction in which the first ridge extends and positioning low-strength portions to sandwich it, as in Construction 5, will efficiently prevent the structural member form being deformed by an impact.

(Construction 7)

Construction 7 will now be described. Starting from any one of Constructions 1, 3 and 4, between one edge of each of the side walls located adjacent to the first ridge and another edge opposite to the first ridge, an edge of each of the low-strength portions located adjacent to the one edge of the side wall may be located between the one edge of the side wall and a position of $1/4$ of a distance between the one edge and the other edge of the side wall as determined from the one edge toward the other edge of the side wall.

(Construction 8)

Construction 8 will now be described. Starting from Construction 7, an edge of the low-strength portion located adjacent to the other edge of the side wall may be located between the other edge of the side wall and a position of $4/5$ of the distance between the one edge and the other edge as determined from the one edge toward the other edge of the side wall. In this case, a dimension of the low-strength portion as measured in a direction from the one edge toward the other edge of the low-strength portion is not less than $1/5$ of the distance between the one edge and the other edge of the side wall.

(Construction 9)

Construction 9 will now be described. Starting from Construction 7 or 8, Construction 9 may include a region adjacent to an edge of the low-strength portion located between the one edge and the other edge of the side wall and having a yield stress higher than the low-strength portion.

(Construction 10)

Construction 10 will now be described. Starting from any one of Constructions 1, 3 and 4, between one edge of each of the side walls located adjacent to the first ridge and another edge opposite to the first ridge, an edge of the high-strength portion located adjacent to the one edge between the low-strength portions may be located between the one edge of the side wall and a position of $2/5$ of the distance between the one edge and the other edge of the side wall as determined from the one edge toward the other edge of the side wall. In this case, an edge of the high-strength portion located adjacent to the other edge of the side wall is located at the other edge of the side wall. An additional low-strength portion having a yield strength of 60 to 85% of that of the high-strength portion is present starting at an edge of the high-strength portion located adjacent to the one edge of the side wall and ending at the one edge of the side wall.

Constructions 7 to 10 will efficiently prevent the structural member from being deformed by an impact against the top portion.

In Constructions 7 to 10, if a side wall is located between the first ridge and second ridge, the first ridge constitutes the one edge of the side wall and the second ridge constitutes the other edge of the side wall. Thus, the distance between the one edge and the other edge of the side wall is represented by the distance between the first ridge and second ridge. If the side wall is located between the first ridge and a joint, the first ridge constitutes the one edge and the joint line defined as a line connecting joint portions arranged in the direction in which the first ridge extends constitutes the other edge. Thus, the distance between the first edge and the other edge of the side wall is defined as the distance between the first ridge and joint line.

(Construction 11)

Construction 11 will now be described. Starting from Construction 2, between one edge of the side wall opposite to the first ridge and another edge located adjacent to the first ridge, an edge of each of the low-strength portions located adjacent to the one edge of the side wall may be located between the one edge of the side wall and a position of $1/4$ of the distance between the one edge and the other edge as determined from the one edge toward the other edge of the side wall.

If the side wall is located between the first ridge and second ridge, the distance between the one edge and the other edge of the side wall is defined as the distance between the first ridge and second ridge. If the side wall is located between the first ridge and a joint, the distance between the one edge and the other edge of the side wall is defined as the distance between the first ridge and a joint line connecting joint portions arranged in the direction in which the first ridges extend.

(Construction 12)

Construction 12 will now be described. Starting from Construction 11, an edge of each of the low-strength portions located adjacent to the other edge of the side wall may be located between the other edge of the side wall and a position of $4/5$ of the distance between the one edge and the other edge of the side wall as determined from the other edge toward the one edge of the side wall. In this case, a dimension of the low-strength portion as measured in a direction from the one edge toward the other edge of the low-strength portion is ⅕ or more of the distance between the one edge and the other edge of the side wall.

(Construction 13)

Construction 13 will now be described. Starting from Construction 11 or 12, Construction 13 may include a region adjacent to an edge of the low-strength portion located between the one edge and the other edge of the side wall, the region having a higher yield stress than the low-strength portion.

(Construction 14)

Construction 14 will now be described. Starting from Construction 2, between one edge of the side wall opposite to the first ridge and another edge located adjacent to the first ridge, an edge of the high-strength portion located adjacent to the one edge of the side wall between the low-strength portions may be located between the one edge of the side wall and a position of ⅖ of a distance between the one edge and the other edge of the side wall as determined from the one edge toward the other edge of the side wall. In this case, an edge of the high-strength portion located adjacent to the other edge is located at the other edge of the side wall. An additional low-strength portion having a yield strength of 60 to 85% of that of the high-strength portion is present starting at the edge of the high-strength portion located adjacent to the one edge of the side wall and ending at the one edge of the side wall.

Constructions 11 to 14 will efficiently prevent the structural member from being deformed by an impact against the closing plate.

In Constructions 11 to 14, if each side wall is located between the first ridge and second ridge, the second ridge constitutes the one edge of the side wall, and the first ridge constitutes the other edge of the side wall. Thus, the distance between the one edge and other edge of the side wall is represented by the distance between the first ridge and second ridge. If each side wall is located between the first ridge and a joint, a joint line connecting joint portions arranged in the direction in which the first ridges extend constitutes the one edge, and the first ridge constitutes the other edge. Thus, the distance between the one edge and the other edge of the side wall is defined by the distance between the first ridge and joint line.

(Construction 15)

Construction 15 will now be described. Starting from any one of Constructions 1, 3, 4 and 7 to 10, the structural member is preferably curved to be convex on the top portion. This will prevent the structural member from being deformed by an impact against the top portion.

(Construction 16)

Construction 16 will now be described. Starting from any one of Constructions 2 and 11 to 14, the structural member is preferably curved to be convex on the closing plate. This will prevent the structural member from being deformed by an impact against the closing plate.

(Construction 17)

Construction 17 will now be described. Starting from any one of Constructions 1 to 16, as viewed along a cross section perpendicular to the direction in which the first ridge extends, at least part of an imaginary line segment connecting portions of the closing plate that are joined to the hat member or the grooved member may be located between the top portion and the closing plate. In Construction 17, the closing plate includes a pair of overlapping portions that overlap the hat member or the grooved member and an intermediate portion located between the overlapping portions. The intermediate portion protrudes away from the hat member or the grooved member relative to the overlapping portions.

(Construction 18)

Construction 18 will now be described. The structural member of Construction 18 is one of the structural members of Constructions 1 to 17 mounted on the vehicle. In this case, the top portion or the closing plate includes two connections separated by 6H or more as measured in the direction in which the first ridge extends and connected to another member.

(Construction 19)

Construction 19 will now be described. Starting from Construction 18, the high-strength portion is preferably located in a middle between the two connections. This will efficiently prevent the structural member from being deformed by an impact.

Embodiments

Figure 2A:
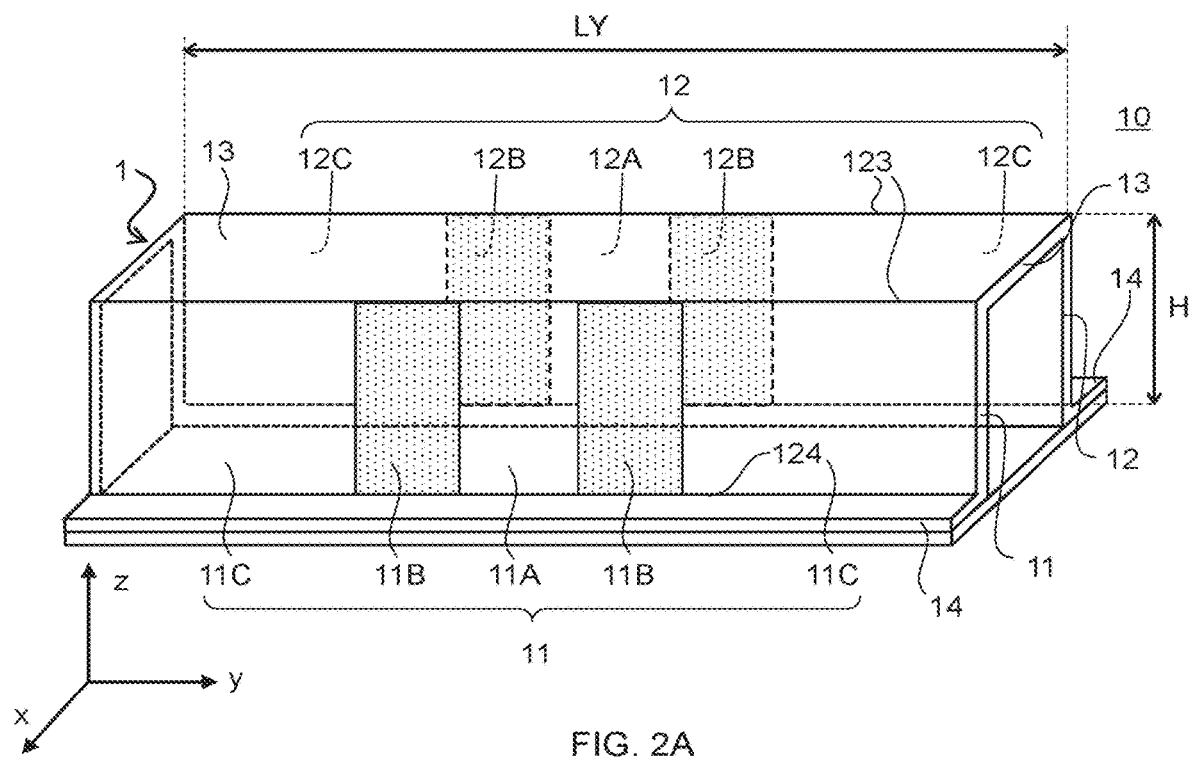
FIG. 2A is a perspective view of the construction of a structural member according to the present embodiment.

FIG. 2A is a perspective view of the construction of a structural member 10 according to the present embodiment. FIG. 2B is a side view of the structural member 10 of FIG. 2A as viewed in the longitudinal direction (i.e. y-direction). FIG. 2C is a side view of the structural member 10 of FIG. 2A as viewed in a direction perpendicular to the longitudinal direction (i.e. x-direction).

The structural member 10 shown in FIGS. 2A to 2C includes a hat member 1 having a hat-shaped cross section and a closing plate 2 joined to the hat member 1. The structural member 10 includes a tubular portion formed by the hat member 1 and closing plate 2. The tubular portion includes, in its interior, a space defined by the hat member 1 and closing plate 2. That is, the tubular portion has a closed cross-sectional construction.

As shown in FIG. 2A, the hat member 1 includes a top portion 13, a pair of side walls 11 and 12, and a pair of flanges 14. The pair of side walls 11 and 12 extend from the two edges of the top portion 13 and face each other. Each of the side walls 11 and 12 has one edge adjacent to the top portion 13 and another edge opposite to the one edge, where the associated flange 14 extends from the other edge outwardly as determined along the direction in which the side walls 11 and 12 facing each other are arranged. The closing plate 2 is joined to the pair of flanges 14.

The border portions between the top portion 13 and the pair of side walls 11 and 12 (i.e. shoulders) 123 form first ridges 123. In the present implementation, the longitudinal direction of the tubular portion is the same as the direction in which the first ridges 123 extend; alternatively, the longitudinal direction of the tubular portion may not be the same as the direction in which the first ridges 123 extend. The longitudinal direction of the tubular portion is defined by the central axis connecting the centers of gravity of cross sections of the tubular portion (i.e. axis). The border portions (i.e. shoulders) 124 between the flanges 14 and the pair of side walls 11 and 12 form the second ridges 124 extending in the longitudinal direction of the tubular portion. The direction in which the second ridges 124 extend may not be the same as the longitudinal direction of the tubular pipe. In the implementation shown in FIG. 2A, the longitudinal direction of the tubular portion is aligned with the y-direction and is the same as the longitudinal direction of the structural member 10. The dimension of the structural member 10 as measured in the direction in which the ridges formed by the border portions between the top portion 13 and the pair of side walls 11 and 12 extend (i.e. y-direction)

is larger than the dimension of the member as measured in the direction in which the pair of side walls 11 and 12, facing each other, are arranged (i.e. x-direction). Further, the dimension LY of the tubular portion formed by the hat member 1 and closing plate 2 as measured in the direction in which the first ridges 123 extend is six or more times the height H of the side walls 11 and 12, i.e. 6H or larger (LY≥6H). The direction in which the first ridges 123 extend may be different from the direction in which the second ridges 124 extend.

Each of the side walls 11 and 12 includes a high-strength portion 11A or 12A and low-strength portions 11B or 12B. The high-strength portions 11A and 12A are formed by portions of the pair of side walls 11 and 12 that face each other. That is, the high-strength portion 11A of one side wall 11 and the high-strength portion 12A of the other side wall 12 are positioned to face each other. Similarly, the low-strength portions 11B and 12B are constituted by portions of the pair of side walls 11 and 12 that face each other. That is, the low-strength portions 11B of the one side wall 11 are positioned to face the low-strength portions 12B of the other side wall 12.

As shown in FIG. 2C, the dimension LA of each of the high-strength portions 11A and 12A, facing each other, as measured in the direction in which the first ridges 123 extend, is not less than (⅔)H and not more than 3H (2H/3≤LA≤3H). The high-strength portions 11A and 12A have a yield strength not less than 500 MPa (or a tensile strength not less than 980 MPa). For each side wall, the low-strength portions 11B or 12B are positioned adjacent to both sides of the high-strength portion 11A or 12A as determined along the direction in which the first ridges 123 extend. That is, as determined along the longitudinal direction of the tubular portion, the high-strength portion 11A or 12A is located between the low-strength portions 11B or 12B. The yield strength of the low-strength portions 11B and 12B is 60 to 85% (not less than 60% and not more than 85%) of that of the high-strength portions 11A and 12A. Similarly, it is desirable that the tensile strength of the low-strength portions 11B and 12B be 60 to 85% of the tensile strength of the high-strength portions 11A and 12A. This will further reduce the extent of protrusion resulting from an impact even when the increase in strength caused by the deformation (work hardening) is considered.

A pair of low-strength portions 11B or 12B are provided in each of the side walls 11 and 12. That is, the one side wall 11 has a pair of low-strength portions 11B sandwiching the high-strength portion 11A. The other side wall 12 has a pair of low-strength portions 12B sandwiching the high-strength portion 12A.

The portions 11C and 12C of the side walls 11 and 12 other than the high-strength portions 11A and 12A and low-strength portions 11B and 12B, i.e. the portions 11C and 12C outward of the low-strength portions 11B and 12B as determined along the direction in which the first ridges 123 extend, have a higher yield strength than the low-strength portions 11B and 12B. For example, the yield strength of these portions 11C and 12C may be equal to that of the high-strength portions 11A and 12A. In the present implementation, the low-strength portions 11B and 12B are the portions having a lower yield strength than the surrounding portions.

As shown in FIGS. 2A to 2C, the low-strength portions 11B and 12B are positioned in the pair of side walls 11 and 12 supporting the top portion 13 which may receive an impact load such that the low-strength portions for each side wall sandwich the associated high-strength portion 11A or 12A, thereby preventing the deformation caused by the impact load from being concentrated on the high-strength portion 11A or 12A and dispersing the deformation to the low-strength portions 11B or 12B. In this implementation, the high-strength portions 11A and 12A have a yield strength not less than 500 MPa (or a tensile strength not less than 980 MPa); the strength ratio of the low-strength portions 11B and 12B to the high-strength portions 11A and 12A is 60 to 85%; and the dimension LA of each of the opposite high-strength portions 11A and 12A is not less than (⅔)H and not more than 3H to allow the deformation caused by an impact load applied to a high-strength portion 11A or 12A to be diffused early to the low-strength portions 11B or 12B. This will prevent sharp-bend deformation of the structural member 10 after an impact. In FIGS. 2A to 2C, the strength of and strength distribution in the flanges 14 are not limited to particular values, because the strength of the flanges 14 does not significantly affect the performance of the structural member 10.

Figure 3:
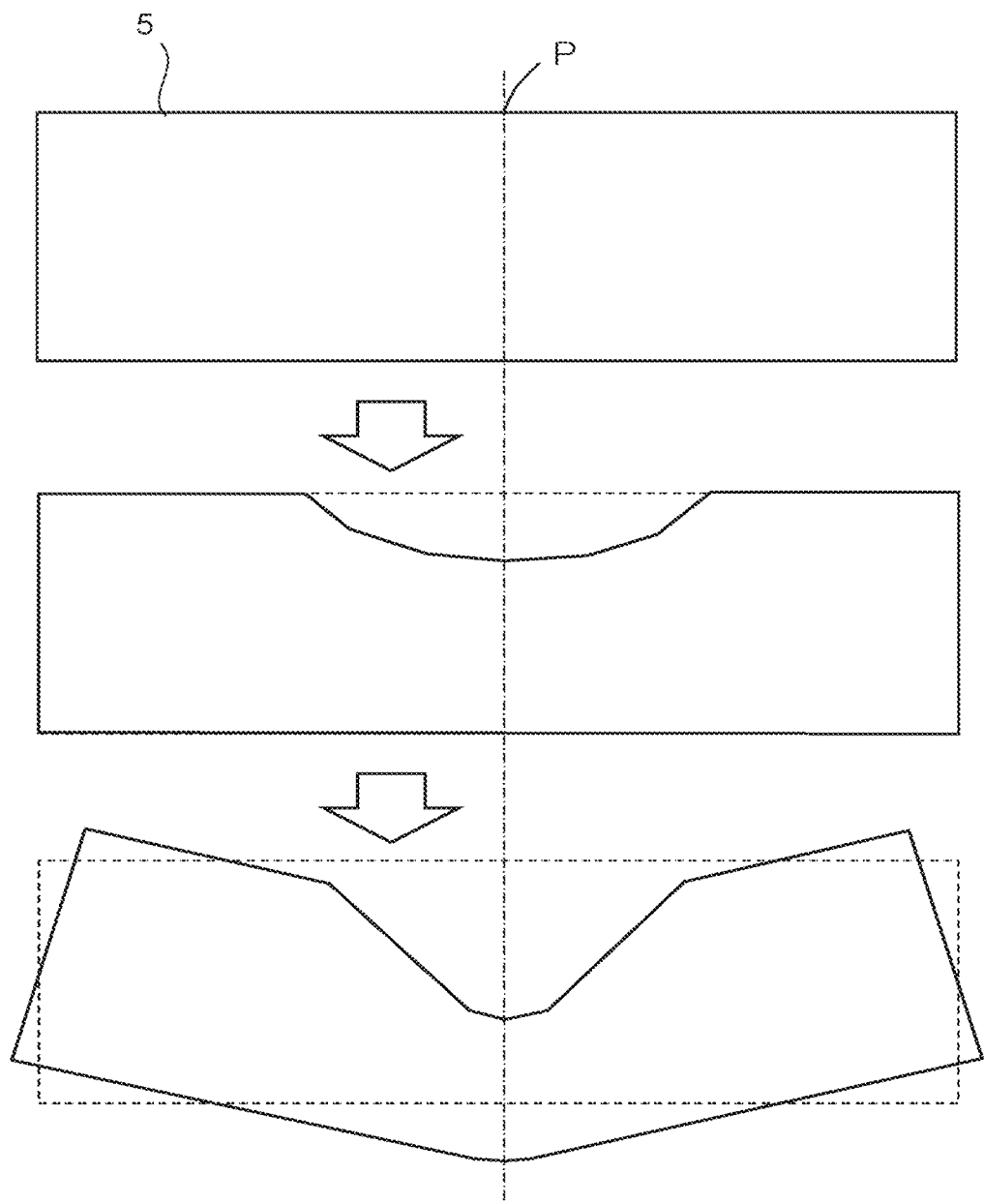
FIG. 3 illustrates the deformation behavior of a structural member with a uniform strength distribution.
Figure 4:
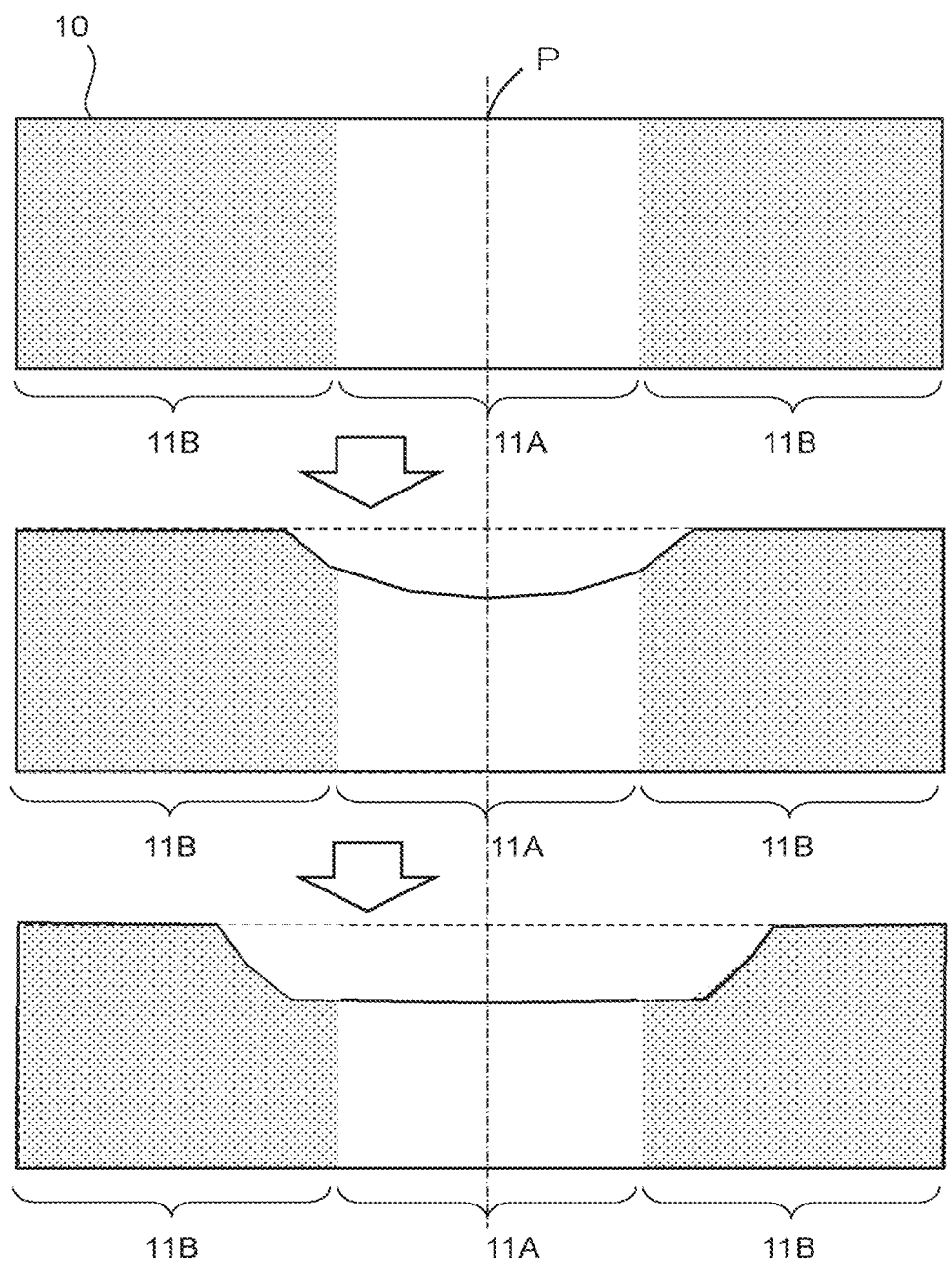
FIG. 4 illustrates the deformation behavior of a structural member having low-strength portions sandwiching a high-strength portion.

FIG. 3 illustrates the deformation behavior of the structural member 5 including a hat member and a closing plate having a uniform strength distribution. FIG. 4 illustrates the deformation behavior of the structural member 10, which includes the low-strength portions 11B or 12B shown in FIGS. 2A to 2C. FIGS. 3 and 4 each show the deformation behavior of the relevant structural member found when an indenter has been caused to hit the tubular portion of the structural member in a direction perpendicular to the longitudinal direction of the member. FIGS. 3 and 4 each show the deformation behavior of a side of the relevant structural member as viewed in a direction perpendicular to the direction of the impact of the indenter and the longitudinal direction of the tubular member.

As shown in FIG. 3, in the structural member 5 having a uniform strength distribution, an impact may cause deformation at the bending deformation initiation point P, which proceeds in a wedge shape as viewed from a side. As a result, the structural member 5 is bent to protrude sharply in the bending direction (i.e. direction of the impact). In some cases, the structural member 5 may develop a crack.

As shown in FIG. 4, in the structural member 10 including the low-strength portions 11B (dotted in FIG. 4) sandwiching the high-strength portion 11A, deformation proceeding inward from the bending deformation initiation point P on the high-strength portion 11A, when reaching the border between the high-strength portion 11A and a low-strength portion 11B, is likely to proceed in a horizontal direction (i.e. longitudinal direction of the structural member 10), which provides a relatively low strength. As such, the deformation expands in the longitudinal direction, and the extent of deformation in the bend direction (i.e. impact direction) is small.

The deformation behaviors shown in FIGS. 3 and 4 are not limited to cases where an indenter has been caused to hit a structural member. Similar deformation behaviors may be produced when, for example, a structural member is bent by an axial force that compresses the member in the longitudinal direction or when a structural member is bent when an indenter is pressed against the member to apply a static force in a direction perpendicular to the longitudinal direction, as in a three-point bending test. Further, the deformation behavior produced when the indenter is caused to hit the top portion of the structural member and that produced when the indenter is caused to hit the closing plate are similar to those in FIGS. 3 and 4.

In use, for example, a structural member 10 may be supported at two distant locations as determined along the longitudinal direction. In such cases, the structural member 10 has two connections to be connected to another member. That is, the structural member 10 is supported by another member at the connections. The connections may also be referred to as supported portions. The connections are positioned on at least one of the side walls 11 and 12, top portion 13 and closing plate 2.

The structural member 10 is fixed to the other member via the connections. The connections of the structural member 10 are joined to the other member by means of fastening members or by welding, for example. Three or more connections may be provided.

The two connections may be located at positions distant by not less than 6H as measured in the direction in which the first ridges 123 extend. That is, the distance KY between the two connections may be not less than six times the height H of the side walls 11 and 12 (KY≥6H). In such implementations, problems similar to those described with reference to FIGS. 1A to 1C occur. That is, the extent of deformation caused by an implementation may be large if the distance KY between the two connections is not less than about six times the dimension of the structural member as measured in the direction of the impact (i.e. height H of the side walls 11 in the implementation of FIG. 2A) (KY≥6H).

To address this problem, the high-strength portions 11A and 12A and low-strength portions 11B and 12B are provided between the two connections. In this arrangement, when an impact is applied to between the two connections, the extent of protrusion caused by the resulting deformation of the structural member 10 will be smaller.

For example, when the structural member 10 is used as a structural member for a vehicle, the structural member 10 may be attached to the vehicle where the member is supported by at least two connections separated in the longitudinal direction of the tubular portion. Here, the structural member 10 may be attached to the vehicle where the top portion 13 is located on the outside of the vehicle and the closing plate 2 is located toward the interior of the vehicle. Alternatively, the structural member 10 may be attached to the vehicle where the closing plate is located on the outside of the vehicle and the top portion 13 is located toward the interior of the vehicle. Thus, when the structural member 10 receives an impact from outside the vehicle, the extent of the protrusion resulting from the member being sharply bent toward the interior of the vehicle will be smaller.

Regardless of whether there are connections, in the structural member 10 shown in FIGS. 2A to 2C, the dimension LA of each high-strength portion 11A or 12A as measured in the direction in which the first ridges 123 extend is not less than (⅔)H and not more than 3H, where H is the height of the side walls 11 and 12 ((⅔)H≤LA≤3H). This will further reduce the extent of deformation caused by an impact against a high-strength portion 11A or 12B. Further, if the dimension LA is not less than H and not more than (4/3)H (H≤LA≤ (4/3)H), this will further reduce the extent of deformation caused by an impact. That is, the dimension LA of each of the high-strength portions 11A and 12A as measured in the direction in which the first ridges 123 extend should be not less than (⅔)H, and preferably not less than H. Further, the dimension LA of each of the high-strength portions 11A and 12A as measured in the direction in which the first ridges 123 extend should be not more than 3H, and preferably not more than (4/3)H.

It is desirable that the dimension LB of each of the low-strength portions 11B and 12B as measured in the direction in which the first ridges 123 extend be not less than (⅗)H (i.e. (⅗)H≤LB). This will further reduce the extent of deformation caused by an impact against a high-strength portion 11A. It is desirable that the dimension LB of each of the low-strength portions 11B be not more than 2H to provide a certain strength to the structural member 10. More preferably, it is desirable that the dimension LB of each of the low-strength portions 11B be not more than H.

The dimension LA of the high-strength portions and the dimension LB of the low-strength portions relative to the height H of the side walls is not limited to the above-discussed relationships, i.e. cases where ((⅔)H≤LA≤3H), (H≤LA≤(4/3)H) or ((⅗)H≤LB), for example, is strictly satisfied. Cases with errors that allow one to deem the dimensions to satisfy the above-discussed relationships are also contemplated. Further, the length LY of the structural member 10 relative to the height H of the side walls is not limited to cases where the above-mentioned relationship, i.e. (6H≤LY), is strictly satisfied. A structural member with a length about six times the height H of the side walls may be deemed to be a structural member having the above-mentioned relationship (6D≤LY).

Further, in the implementation shown in FIGS. 2A to 2C, the border between a low-strength portion 11B and the high-strength portion 11A and the border between a low-strength portion 12B and the high-strength portion 12A extend on a plane perpendicular to the longitudinal direction of the tubular portion. The border between a low-strength portion and a high-strength portion is not limited to such implementations. The border between a low-strength portion and a high-strength portion need not be on a plane perpendicular to the longitudinal direction of the tubular portion. For example, the border between a low-strength portion and a high-strength portion may be oblique relative to a plane perpendicular to the longitudinal direction of the tubular portion, or may meander. In such implementations, the border between a low-strength portion and a high-strength portion is deemed to be located in the middle between the position on the oblique or meandering border that is furthest into the low-strength portion and the position that is furthest into the high-strength portion. The same applies to the border between a portion 11C, outward of a low-strength portion 11B or 12B as determined along the longitudinal direction of the tubular portion, and the low-strength portion 11B or 12B.

Figure 1C:
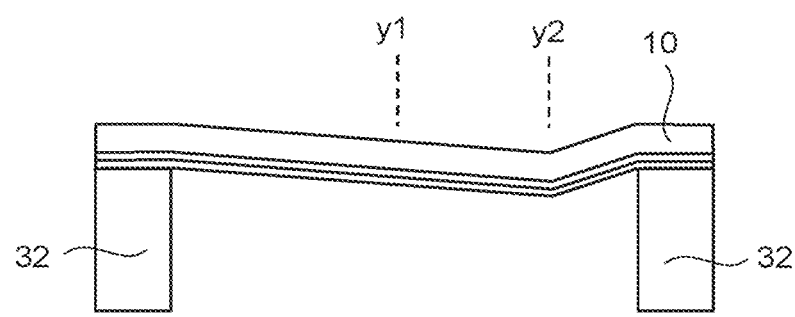
FIG. 1C shows another exemplary deformation behavior of the structural member of FIG. 1A.

To address the problems described with reference to FIGS. 1A to 1C, it is desirable that the high-strength portions 11A and 12A be positioned in a portion of the structural member 10 that can easily be broken, such as the middle of the member as determined along the direction in which the first ridges 123 extend. That is, it is desirable that at least a portion of each of the high-strength portions 11A and 12A be positioned in the middle of the structural member 10 as determined along the direction in which the first ridges 123 extend. Alternatively, if the structural member 10 is joined to another member at two connections, as discussed above, it is desirable that the high-strength portions 11A and 12A be located in the middle of the member between the two connections. That is, it is desirable that at least a portion of each of the high-strength portions 11A and 12A be located in the middle of the member between the two connections. This will effectively prevent sharp bending in a portion of the structural member 10 at which the moment of an impact is largest and that can easily be bent sharply (i.e. the middle of the member or an intermediate position between the connections) regardless of whether there are connections or not.

Figure 5A:
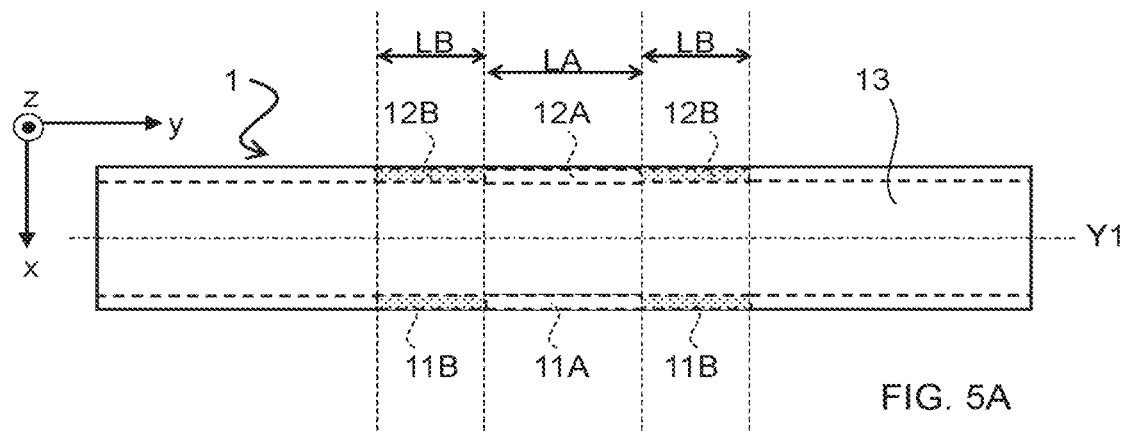
FIG. 5A is a top view of the structural member of FIG. 2A, as viewed in the z-direction.

FIG. 5A is a top view of the structural member 10 shown in FIG. 2A as viewed from above (top portion 13, in the z-direction). In FIG. 5A, the side walls 11 and 12 visible if one could see through the top portion 13 are indicated by broken lines. To prevent the structural member 10 from being twisted and sharply bent, as in the implementation shown in FIG. 5A, it is desirable that the high-strength portions 11A and 12A, facing each other, of the pair of side walls 11 and 12 be positioned so as to completely overlap as viewed in the direction in which the side walls 11 and 12 facing each other are arranged (x-direction). That is, the entire high-strength portion 11A of one side wall 11 overlaps the entire high-strength portion 12A of the other side wall 12 as viewed in the direction in which these portions are arranged. The low-strength portions 11B and 12B, facing each other, of the pair of side walls 11 and 12 are positioned to completely overlap as viewed in the direction in which these portions are arranged (x-direction). That is, each entire low-strength portion 11B of the one side wall 11 and the corresponding entire low-strength portion 12B of the other side wall 12 overlap each other as viewed in the direction in which these portions are arranged. In the implementation shown in FIG. 5A, the direction in which the side walls 11 and 12 facing each other are arranged is perpendicular to the longitudinal direction of the tubular portion (i.e. central axis Y1).

In FIG. 5A, the strength distribution in one side wall 11 is a mirror image of the strength distribution in the other side wall 12. That is, the high-strength portion 11A or 12A and low-strength portions 11B and 12B of each of the pair of side walls 11 and 12 are symmetrical with respect to the imaginary median plane Y1 for the pair of side walls 11 and 12. This will further reduce the possibility of one of the side walls 11 and 12 being crushed before the other. The imaginary median plane Y1 for the side walls 11 and 12 is the same as the perpendicular bisector A of the top portion 13 on a cross section perpendicular to the longitudinal direction of the tubular portion (see FIG. 2B).

For example, in the implementations shown in FIGS. 2A to 2C and 5A, the pair of side walls 11 and 12 have the same height. The angle between the side wall 11 and top portion 13 is equal to the angle between the side wall 12 and top portion 13. Thus, in a cross section perpendicular to the longitudinal direction of the tubular portion, the cross-sectional shape of the structural member 10 is symmetrical with respect to the perpendicular bisector A of the top portion 13. Further, the strength distribution in that cross section of the structural member 10 is symmetrical with respect to the perpendicular bisector A. This will reduce bias in stresses caused by an impact.

Figure 5B:
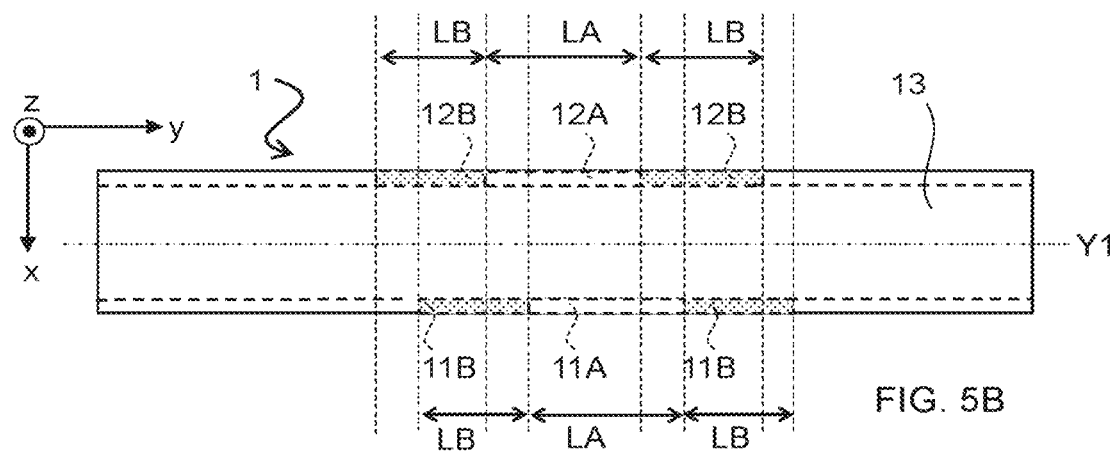
FIG. 5B shows a variation of the structural member of FIG. 2A with a different configuration of the high-strength portion and low-strength portions.

FIG. 5B shows a variation of the structural member 10 shown in FIG. 2A with a different configuration of the high-strength portions 11A and 12A and low-strength portions 11B and 12B. In the implementation shown in FIG. 5B, the high-strength portions 11A and 12A, facing each other, of the pair of side walls 11 and 12 are arranged such that parts thereof overlap as viewed in the direction in which these portions are arranged (x-direction). Thus, at least a portion of the high-strength portion 11A of one side wall 11 may overlap the high-strength portion 12A of the other side wall 12 as viewed in the direction in which these portions, which face each other, are arranged. The low-strength portions 11B and 12B, facing each other, of the pair of side walls 11 and 12 are positioned such that parts thereof overlap as viewed in the direction in which these portions, which face each other, are arranged (x-direction). Thus, at least a portion of each low-strength portion 11B of one side wall 11 may overlap the corresponding low-strength portion 12B of the other side wall 12 as viewed in the direction in which these portions facing each other are arranged. In the implementation of FIG. 5B, the top portion 13 can easily be bent sharply to extend obliquely relative to the imaginary median plane Y1. Since the top portion 13 cannot easily be bent sharply by the minimum distance, the impact energy absorbed is high.

In the implementations shown in FIGS. 5A and 5B, the dimensions LA of the high-strength portions 11A and 12A, facing each other, as measured in the direction in which the first ridges 123 extend are equal. Alternatively, the dimension LA of the high-strength portion 11A of the one side wall 11 may be different from the dimension LA of the high-strength portion 12A of the other side wall 12 as measured in the direction in which the first ridges 123 extend as long as they satisfy $\frac{2}{3}H \leq LA \leq 3H$.

In the implementations shown in FIGS. 5A and 5B, the dimensions LB of the ones of the low-strength portions 11B and 12B that face each other as measured in the direction in which the first ridges 123 extend are equal. Alternatively, the dimensions LB of the ones of the low-strength portions 11A and 12A of the side walls 11 and 12 that face each other as measured in the direction in which the first ridges 123 extend may be different. For the one side wall 11, the dimensions LB of the low-strength portions 11B sandwiching the associated high-strength portion 11A may be different. For the other side wall 12, too, the dimensions LB of the pair of low-strength portions 12B sandwiching the associated high-strength portion 12A may be different. In any case, it is desirable that each dimension LB satisfy $\frac{3}{5}H \leq LB$. This will facilitate deformation of the low-strength portions and, as a result, further reduce the extent of deformation resulting from an impact.

In the structural member 10, a ridge is formed along the border between the top portion 13 and each of the pair of side walls 11 and 12. Similarly, a ridge is formed along the border between a flange 14 and the associated one of the pair of side walls 11 and 12. These ridges extend in the longitudinal direction of the tubular portion. The ridges increase the strength against an impact against the structural member 10. The high-strength portions 11A and 12A and low-strength portions 11B and 12B are provided in the side walls 11 and 12, to which the top portion 13, which may receive an impact, is connected via the ridges. This prevents sharp bending of the structural member 10 after an impact against the top portion 13.

Figure 6A:
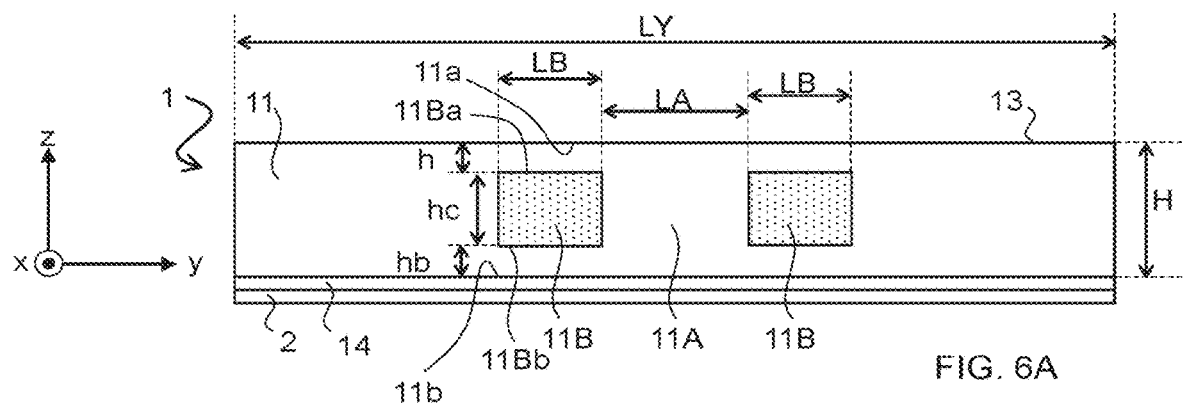
FIG. 6A shows a variation of the structural member of FIG. 2A with a different arrangement of the low-strength portions.

FIG. 6A shows a variation of the structural member 10 shown in FIG. 2A with a different arrangement of the low-strength portions 11B and 12B. In the implementation shown in FIG. 6A, each low-strength portion 11B extends a portion of the height of the associated side wall 11 in the z-direction. That is, the low-strength portion 11B extends a portion of the distance between the edge of the side wall 11 adjacent to the top portion 13 and the edge adjacent to the associated flange 14. As determined along the height direction of the side wall 11, the low-strength portion 11B extends from a position distant from the one edge 11a of the side wall 11 (or top portion 13) by h to a position distant from the other edge 11b (or flange 14) by hb. That is, that edge 11Ba of the low-strength portion 11B which is closer to the one edge 11a (referred to as one-edge edge) is distant from the one edge 11a by h, and that edge 11Bb of the low-strength portion 11B which is closer to the other edge 11b (referred to as other-edge edge) is distant from the other edge 11b by hb. The low-strength portion 11B is not in contact with the one edge 11a (or top portion 13) nor the other edge 11b (or flange 14). Although not shown, each low-strength portion 12B of the side wall 12 facing a low-strength portion 11B also extends a portion of the height of the side wall 12. That is, each of the side walls 11 and 12 is permitted to have low-strength portions 11B or 12B that extend a portion of their height. The variation shown in FIG. 6A will also reduce the extent of protrusion resulting from the deformation of the structural member 10 after an impact.

In such implementations, to reduce the extent of deformation, it is desirable that the distance h between the one edge 11a of the side wall 11 or 12 and that edge 11Ba of each low-strength portion 11B or 12B which is closer to the one edge 11a as measured in the height direction of the side wall 11 or 12 be not more than (¼)H (h≤H/4). That is, it is desirable that the edge 11Ba of the low-strength portion 11B be located between the one edge 11a and a position distant therefrom by (¼)H as measured in the height direction of the side wall. Preferably, to reduce the extent of deformation, it is desirable that the distance h is not more than (⅕)H (h≤H/5). The yield strength of the portion of the side wall located between that edge 11Ba of the low-strength portion 11B or 12B which is closer to the one edge 11a and the one edge 11a may be equal to the yield strength of the high-strength portions 11A and 12A.

To reduce the extent of deformation, it is desirable that the distance hb between the other edge 11b of the side wall 11 or 12 and each low-strength portion 11B or 12B as measured in the height direction of the side wall 11 or 12 be not more than (⅘)H (hb≤4H/5). To further reduce the extent of deformation, it is desirable that the distance hb be not more than (½)H (hb≤H/2).

It should be noted that, regardless of what permissible value is taken by h and hb, the dimension hc of the low-strength portions 11B and 12B as measured in the height direction of the side wall 11B or 12B (z-direction) must be not less than (⅕)H to reduce the extent of deformation ((H/5≤hc). To further reduce the extent of deformation, it is desirable that the dimension hc be not less than (¼)H (H/4≤hc).

Figure 6B:
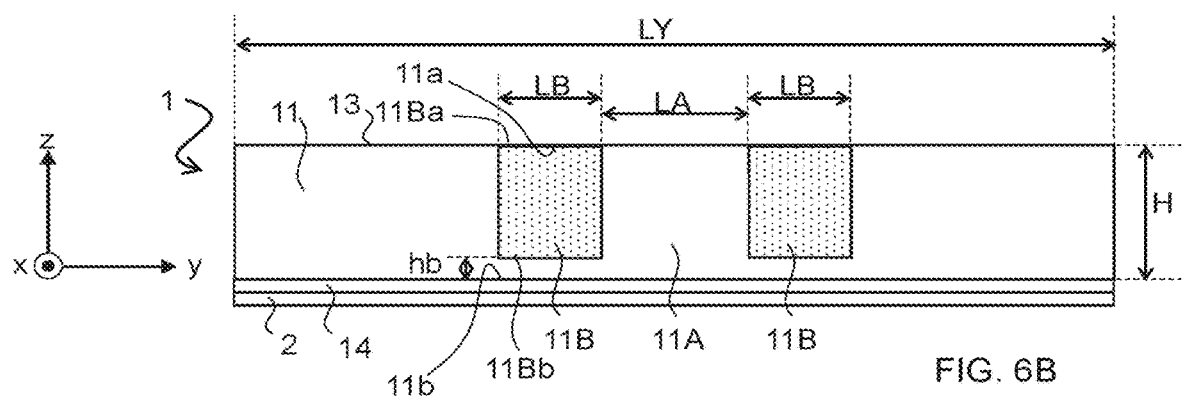
FIG. 6B shows a variation of the structural member of FIG. 2A with a different arrangement of the low-strength portions.

FIG. 6B shows a variation starting from FIG. 6A, where h=0.

Figure 6C:
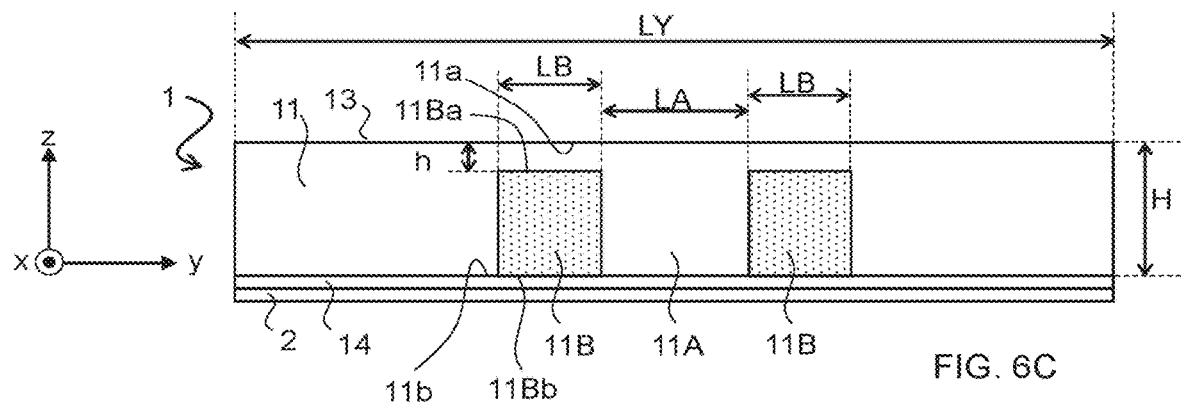
FIG. 6C shows a variation of the structural member of FIG. 2A with a different arrangement of the low-strength portions.

FIG. 6C shows a variation starting from FIG. 6A, where hb=0.

As illustrated in FIGS. 6A to 6C, low-strength portions are provided such that that edge of each low-strength portion which is closer to the one edge of the wall is located between the one of the edges of the side wall and a position distant therefrom by (¼)H as determined along the height direction of the side wall. That is, each low-strength portion extends at least a portion of the range starting at a position on the side wall distant from the one edge of the side wall by (¼)H and ending at the one edge of the side wall. This will reduce the extent of deformation of the structural member 10 when an impact is applied to the one edge of the side wall. Further, the low-strength portions are permitted to be provided such that that edge of each low-strength portion which is closer to the other edge is located between the other one of the two edges and a position distant therefrom by (⅘)H as determined along the height direction of the side wall. However, to minimize the extent of deformation, the dimension of the low-strength portion as measured in the height direction of the side wall must be at least ⅕H.

In the implementations shown in FIGS. 6A to 6C, that one of the two edges of each side wall 11 or 12 which is in contact with the top portion 13 is treated as the one edge, while that edge which is in contact with the flange 14 is treated as the other edge to set the distances h, hb and hc. In this case, setting the distances h, hb and hc as discussed above reduces the extent of deformation of the structural member 10 found when an impact is applied to the top portion 13. Alternatively, that one of the two edges of each side wall 11 or 12 as determined along the height direction which is in contact with the flange 14 may be treated as the one edge, and that edge which is in contact with the top portion 13 may be treated as the other edge to set the distances h, hb and hc. In this case, the distances h, hb and hc may be set similarly to the above-discussed implementation. This will further reduce the extent of deformation of the structural member 10 found when an impact is applied to the closing plate 2.

Figure 6D:
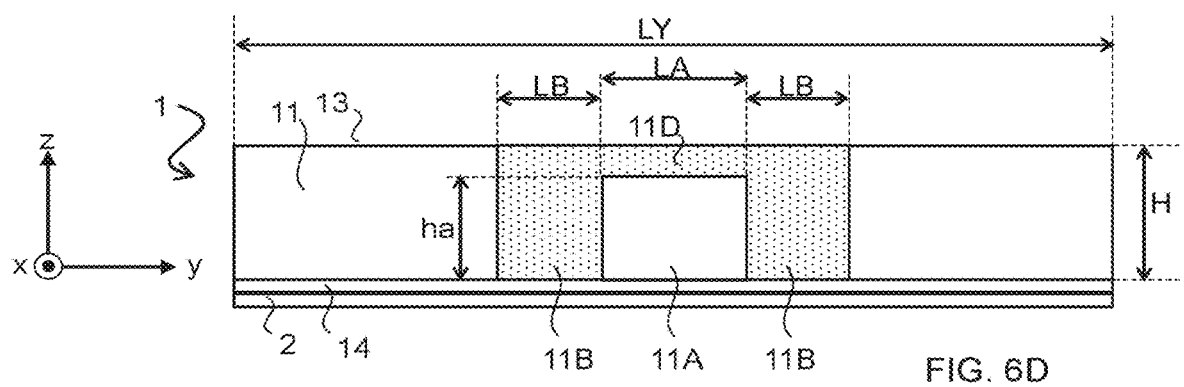
FIG. 6D shows a variation of the structural member of FIG. 2A with a different arrangement of the low-strength portions.

FIG. 6D shows another variation of the structural member 10 shown in FIG. 2A with a different arrangement of the high-strength portions 11A and 12A. In the implementation shown in FIG. 6D, for each side wall, the high-strength portion 11A between the low-strength portions 11B extends from the other edge (or flange 14) to a position distant from the other edge by ha as measured in the height direction of the side wall 11. As measured in the height direction of the side wall, an additional low-strength portion 11D is provided that extends from the high-strength portion 11A to the one edge (or top portion 13) of the side wall 11. The yield strength of the additional low-strength portion 11D is 60 to 85% of the yield strength of the high-strength portion 11A. Thus, the high-strength portion 11A sandwiched by the low-strength portions 11B as determined along the direction in which the first ridges 123 extend may extend a portion of the height of the side wall 11. To reduce the extent of deformation, the distance ha may be not less than (⅗)H, for example. To further reduce the extent of deformation, it is desirable that the distance ha be not less than (⅘)H. Similarly, although not shown, the high-strength portion 12A of the side wall 12 may extend from the other edge (or flange 14) to a position distant from the other edge by ha as measured in the height direction of the side wall 12. In this case, an additional low-strength portion extends from the high-strength portion 12A to the other edge (i.e. top portion 13) of the side wall 12 as measured in the height direction of the side wall.

Thus, the one-edge edge of each high-strength portion is located between the one edge of the side wall and a position distant therefrom by (⅖)H, while the other-edge edge of the high-strength portion is aligned with the other edge of the side wall. In this case, an additional low-strength portion is provided between the one-edge edge of the high-strength portion and the one edge of the side wall. This will further reduce the extent of deformation of the structural member 10 found when an impact is applied to the one edge.

In the implementation shown in FIG. 6D, the one edge of the side wall 11 is in contact with the top portion 13, while the other edge is in contact with the flange 14. This will reduce the extent of deformation of the structural member 10 found when an impact is applied to the top portion 13. Alternatively, that one of the two edges of the side wall 11 or 12 as determined along the height direction which is in contact with the flange 14 may be treated as the one edge and that edge which is in contact with the top portion 13 may be treated as the other edge to set the distance ha similarly to the above-discussed implementation. This will further reduce the extent of deformation of the structural member 10 found when an impact is applied to the closing plate 2.

Figure 7A:
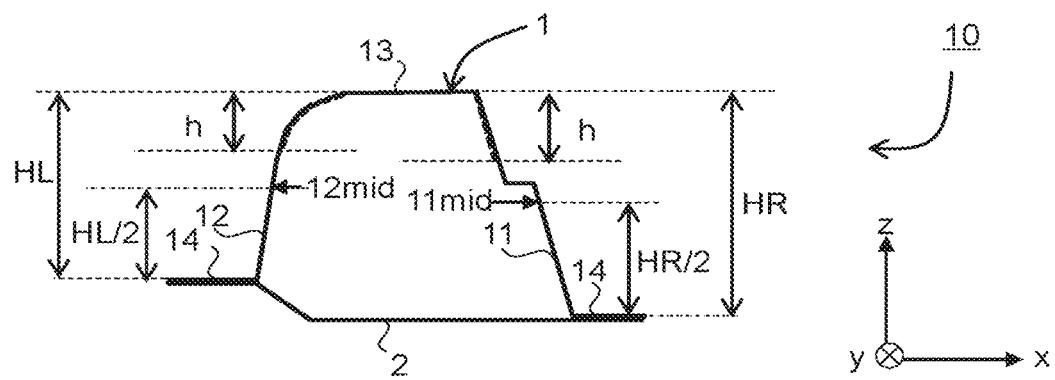
FIG. 7A is a cross-sectional view of a variation of the structural member with a different cross-sectional shape.

FIG. 7A is a cross-sectional view of a variation of the above-discussed structural member 10 with a different cross-sectional shape. The structural member 10 shown in FIG. 7A includes a pair of side walls 11 and 12 with different shapes. The side walls 11 and 12 have different angles relative to the flanges 14 and different heights HR and HL. Thus, the positions of the flanges 14 as determined along the height direction are different from each other. Further, the position 11mid of one-half of the height HR of one side wall 11 is different from the position 12mid of one-half of the height HL of the other side wall 12 as measured in the height direction. If the structural member 10 has a cross section that is not symmetrical, the heights HR and HL and the middle positions 11mid and 12mid, as determined along the height direction, of the side walls 11 and 12 are defined separately.

Even in an implementation where the structural member 10 has a non-symmetrical cross section, as shown in FIG. 7A, at least portions of the high-strength portions 11A and 12A of the pair of side walls 11 and 12 are positioned to face each other. Similarly, at least portions of the low-strength portions 11B and 12B of the pair of side walls 11 and 12 are positioned to face each other. Further, as shown in FIGS. 6A to 6D, each of the low-strength portions 11B and 12B or high-strength portions 11A and 12A may extend a portion of the height of the side wall 11 or 12. For example, if each of the low-strength portions 11B and 12B extends from a position distant from the one edge 11a of the side wall 11 by h toward the other edge 11b, as in FIG. 6A or 6C, the distance h for the one side wall 11 may be different from the distance h for the other side wall 12 because they are determined relative to HR and HL.

In the implementation shown in FIG. 7A, which includes a pair of side walls 11 and 12, the one side wall 11 has a step. In implementations with such a step on a side wall 11, the distance between the one edge of the side wall 11 which is in contact with the top portion 13 and the other edge in contact with the flange 14 as measured in the height direction is treated as the height HR of the side wall 11. That is, the distance between the lowermost point of the side wall 11 and the uppermost point thereof as determined along the height direction is treated as the height HR of the side wall 11. The same applies to implementations with side walls 11 with recesses and protrusions or with holes. In such implementations, the height direction is the direction perpendicular to the top portion 13. The distances h, ha, hb and hc shown in FIGS. 6A to 6D are also set based on the distances as measured in the height direction.

The other side wall 12 has a round portion (or curved portion) on and adjacent to the one edge. That is, the portion of the side wall 12 on and adjacent to the one edge is roundly curved. Thus, the surface of the border portion (or corner) of the side wall 12 and top portion 13 is curved. In this implementation, the height HL of the side wall 12 and the distance h are set where the edge of the side wall 12 is defined as that portion of the rounded portion which is farthest from the middle 12mid of the side wall 12 as determined along the height direction.

Although not shown, the surface of at least one of the top portion 13, side walls 11 and 12, flange 14 and closing plate 2 may be curved rather than flat. That is, at least one of the top portion 13, side walls 11, flange 14 and closing plate 2 may be curved.

In the structural member 10 as described above, the dimensions of the hat member 1 and closing plate 2 are equal as measured in the longitudinal direction of the tubular portion. Further, the edges of the hat member 1 and closing plate 2 as determined along the longitudinal direction are aligned in position. In this case, the longitudinal dimension of the tubular portion is equal to the longitudinal dimension of the structural member 10. On the other hand, as measured in the longitudinal direction of the tubular portion, the dimension of the hat member 1 may be different from the dimension of the closing plate 2. Further, edges of the hat member 1 and closing plate 2 as determined along the longitudinal direction may not be aligned in position. That is, the dimension of the structural member 10 and the dimension of the tubular portion may be different as measured in the longitudinal direction of the tubular portion.

Figure 7B:
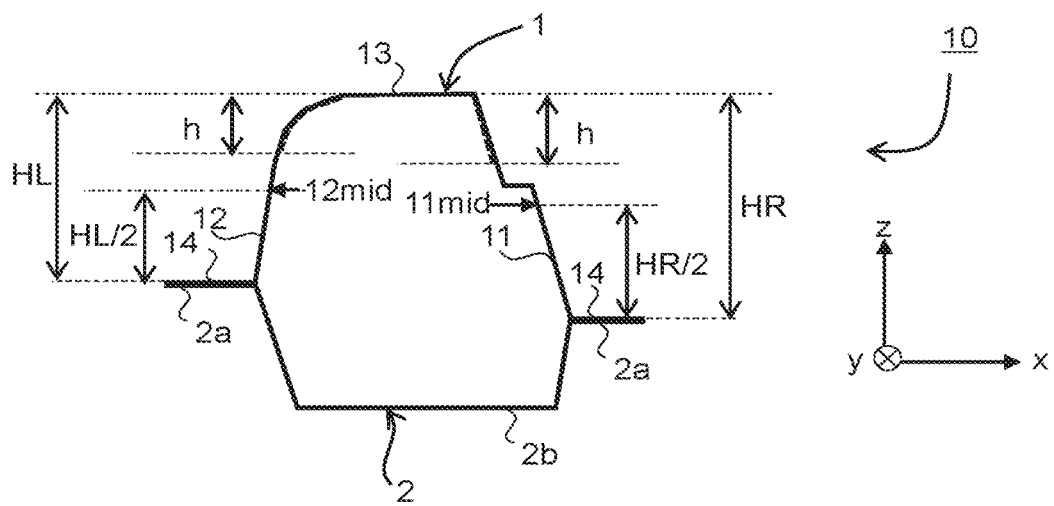
FIG. 7B is a cross-sectional view of another variation of the structural member with a different cross-sectional shape.

FIG. 7B shows a cross-sectional view of a variation of the closing plate 2. In the implementation shown in FIG. 7B, the closing plate 2 is shaped to protrude away from the hat member 1. Specifically, the closing plate 2 includes joints 2a joined to the flange 14 of the hat member 1 and an intermediate portion 2b between the joints. The intermediate portion 2b is shaped to protrude away from the hat member 1. In this implementation, the closing plate 2 has a hat-shaped cross section. The outer surface of the intermediate portion 2b is generally parallel to the outer surfaces of the joints 2a.

As the closing plate 2 is shaped to protrude away from the hat member 1, the dimension of the structural member 10 as measured in the height direction can be adjusted. The heights of the side walls (H, HL, HR), relative to which the low-strength portions and high-strength portions are positioned, do not vary depending on the dimension of the closing plate 2 as measured in the height direction.

Several features such as an unsymmetrical shape for the hat member 1, a step, round portions on the side wall edges, a shape for the closing plate 2 have been described with reference to FIGS. 7A and 7B. Other than implementations combining all these features (i.e. implementations shown in FIGS. 7A and 7B), implementations of the structural member 10 including at least one of these features are also contemplated by the present invention.

Figure 8:
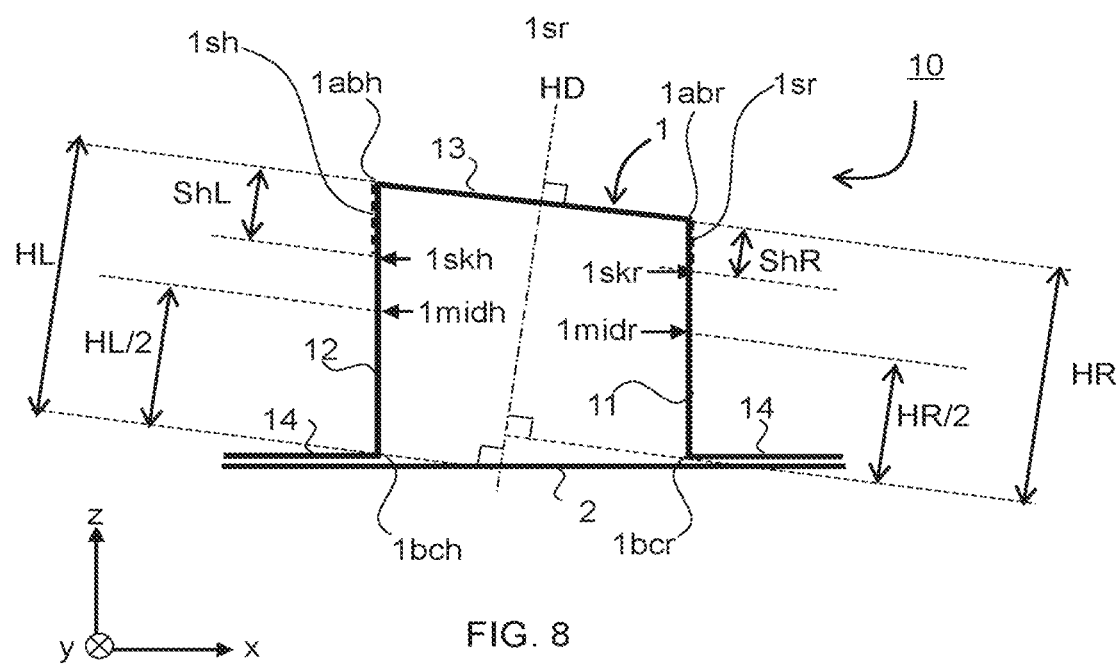
FIG. 8 illustrates the height direction of the side walls.

FIG. 8 illustrates the height direction of the side walls 11 and 12 of an implementation with an inclined top portion 13. FIG. 8 shows the height direction of the structural member 10 where the top portion 13 is expected to receive an impact. In the structural member 10 shown in FIG. 8, the top portion 13 of the hat member 1 is not parallel to the flanges 14. Further, the dimensions of the one side wall 11 and the other side wall 12 as measured in the z-direction are different. If the top portion 13 is expected to receive an impact, the height direction of the side walls 11 and 12 is perpendicular to the top portion 13. The heights HL and HR of the side walls 11 are determined with respect to the height direction of the side walls 11 and 12. If the closing plate 2 is expected to receive an impact, the height direction of the side walls 11 and 12 is defined as the direction perpendicular to the closing plate.

Figure 9A:
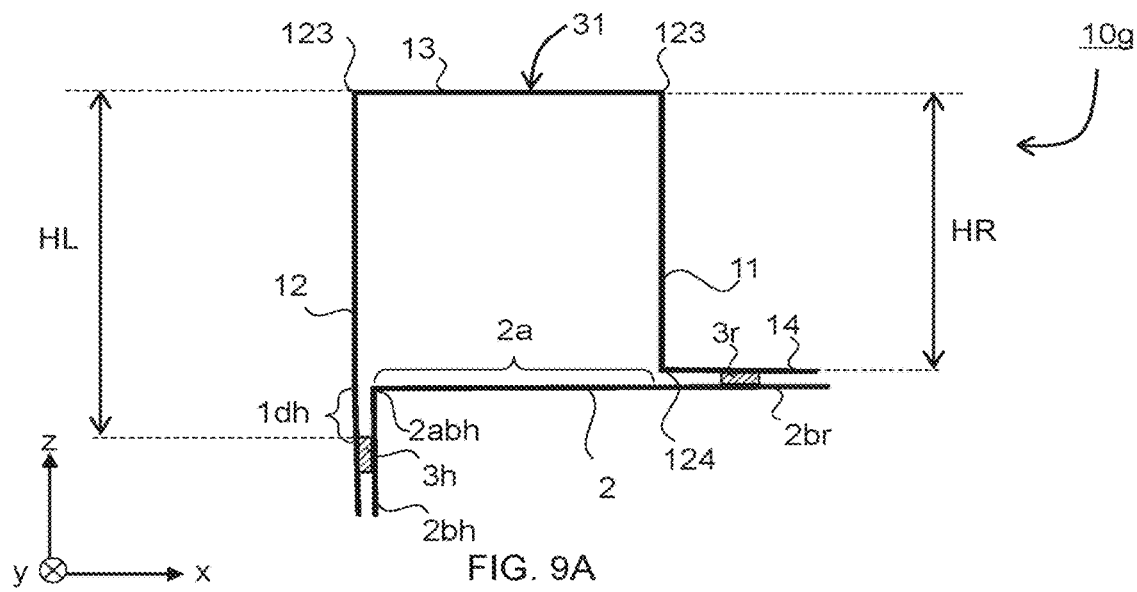
FIG. 9A is a cross-sectional view of a variation of the structural member.
Figure 9B:
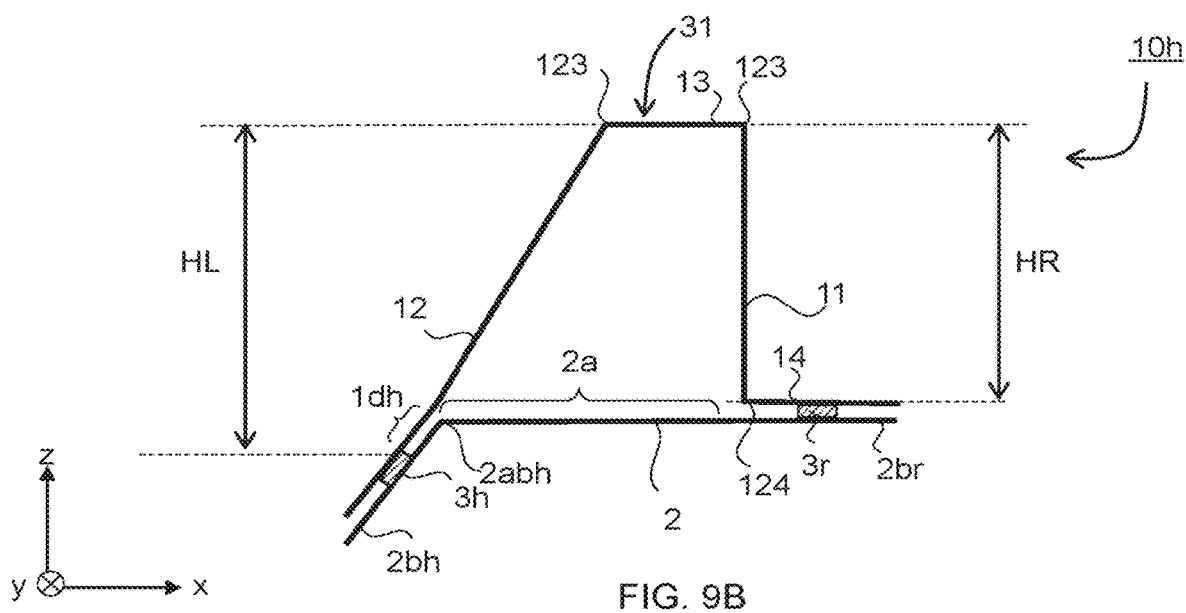
FIG. 9B is a cross-sectional view of another variation of the structural member.
Figure 9C:
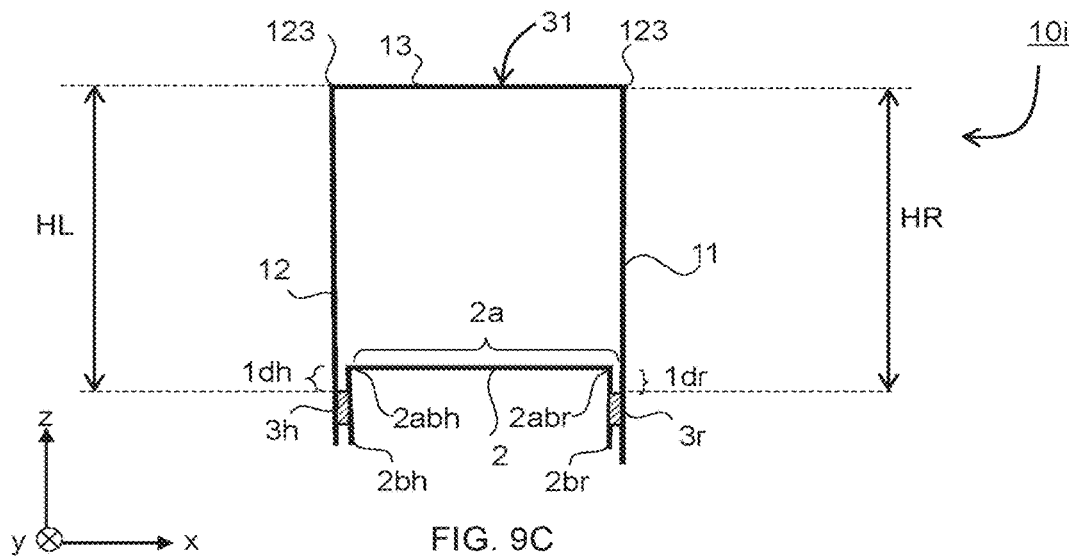
FIG. 9C is a cross-sectional view of yet another variation of the structural member.
Figure 9D:
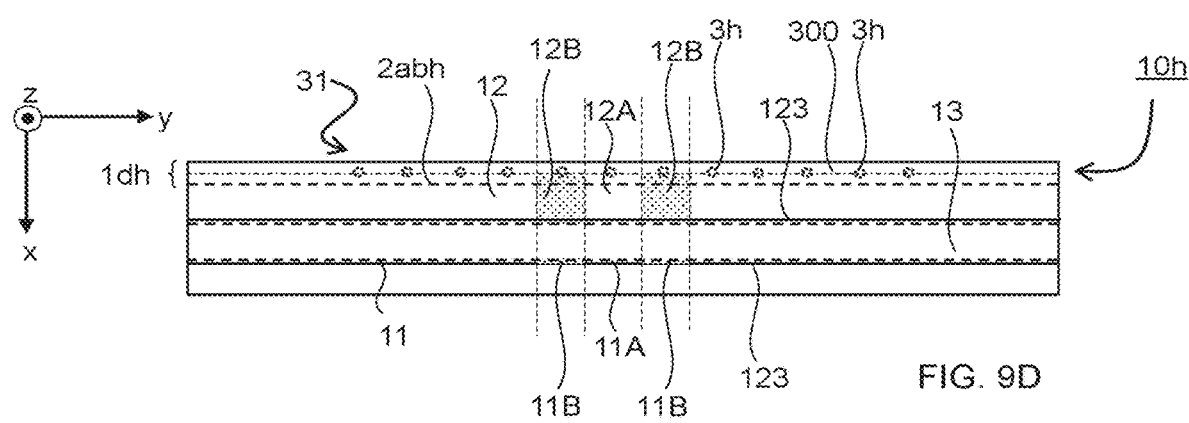
FIG. 9D is a top view of the structural member shown in FIG. 9B as viewed in the z-direction.

FIGS. 9A to 9C are cross-sectional views showing variations of the structural member of the present embodiment. FIGS. 9A to 9C show cross-sectional shapes taken along planes perpendicular to the longitudinal direction of the structural member. The implementations shown in FIGS. 9A and 9B are exemplary implementations of Construction 4 described above. The implementation shown in FIG. 9C is an exemplary implementation of Construction 3 described above. FIG. 9D is a top view of the structural member shown in FIG. 9B as viewed in the z-direction.

In each of the variations shown in FIGS. 9A to 9C, the hat member including two flanges are replaced by a grooved member including no flange or a grooved member including one flange. In the structural member 10 shown in FIGS. 2A to 2C, the first and second ridges 123 and 124 on both edges of each side wall 11 contributes to the resistance to deformation caused by a load in a direction perpendicular to the top portion 13 (i.e. bend rigidity). On the other hand, in the variations shown in FIGS. 9A to 9C, the first ridge and joint on both edges of at least one of the two side walls contributes to the bending rigidity.

Each of the structural members 10g, 10h and 10i shown in FIGS. 9A to 9C includes a grooved member 31 that is shaped as a groove and a closing plate 2 joined to the grooved member 31. The grooved member 31 shown in each of FIGS. 9A to 9C includes a top portion 13, two side walls 11 and 12 extending from the two edges of the top portion 13, and two joints 3r and 3h that join the grooved member 13 to the closing plate 2. The two side walls 11 and 12 face each other. Each of the two joints 3r and 3h is in a location where a portion of the grooved member 31 overlaps the closing plate 2. The joints 3r and 3h may be spot welds or laser welds, for example. If each joint consists of discontinuous (or intermittent) joint portions arranged in the direction in which the first ridges 123 of the grooved member 31 extend, the joint is considered to be located so as to connect the discontinuous joint portions. That is, the joint is considered to be on a line connecting the joint portions arranged intermittently. The side walls are located between the joints and first ridges. The first ridges 123 are located between the top portion 13 and the two side walls 11 and 12. For example, in the implementation shown in FIG. 9D, a plurality of joint portions 3h are arranged in the y-direction (i.e. direction in which the first ridges 123 extend). The joint line is defined by an imaginary line 300 extending in the y-direction (i.e. direction in which the first ridge lines 123 extend), which connects the joint portions.

In the grooved portion 31 shown in each of FIGS. 9A and 9B, the two side walls 11 and 12 include a first side wall 11 and a second side wall 12. One edge of the first side wall 11 is adjacent to the top portion 13, while the other edge is opposite to the one edge and is bent. The flange 14 extends from this bent portion. The flange 14 lies over the closing plate 2. The flange 14 has a contact surface that is in contact with the closing plate 2. The flange 14 and closing plate 2 are joined to each other at a joint 3r.

The first side 11 is positioned between the one of the two first ridges 123 and the flange 14. A second ridge 124 is present between the flange 14 and the first side wall 11. The second ridge 124 is an edge of the flange 14. In the present implementation, the second ridge 124 extends in the same direction as the first ridges 123, i.e. in the longitudinal direction of the grooved member 31 (i.e. y-direction).

The height HR of the first side wall 11 is defined as the height of the associated first ridge 123 as measured in the direction perpendicular to the top portion 13, i.e. the distance between the first and second ridges 123 and 124 as measured in the direction perpendicular to the top portion 13.

The second side wall 12 is located between the other one of the two first ridges 123 and the joint 3h. The second side wall 12 is not bent. A portion of the second side wall 12 that is located adjacent to the joint 3h overlaps the closing plate 2. A portion of the second side wall 12 adjacent to the joint 3h includes a contact surface 1dh to be in contact with the closing plate 2. The second side wall 12 extends in the same direction as the contact surface 1dh.

The height HL of the second side wall 12 is the distance between the associated first ridge 123 and joint 3h as measured in the direction perpendicular to the top portion 13.

In the grooved member 31 shown in FIG. 9C, two side walls 11 and 12 are located between two respective first ridges 123 and two respective joints 3r and 3h. The height HR of one of the two side walls, 11, is defined as the distance between the associated first ridge 123 and the joint 3r as measured in the direction perpendicular to the top portion 13. The height HL of the other one of the side walls, 12, is defined as the distance between the associated first ridge 123 and joint 3h as measured in the direction perpendicular to the top portion 13.

The grooved portion 31 shown in each of FIGS. 9A to 9C, the first side wall 11 includes a high-strength portion 11A located to face the second side wall 12 and extending a distance not less than ⅔ times the height HR and not more than 3 times HR as measured in the direction in which the first ridges 123 extend (y-direction). Low-strength portions 11B are positioned to sandwich the high-strength portion 11A as determined along the direction in which the first ridges extend (y-direction). The second side wall 12 includes a high-strength portion 12A located to face the first side wall 11 and extending a distance not less than ⅔ times HL and not more than 3 times HL as measured in the direction in which the first ridges 123 extend (y-direction). Low-strength portions 12B are positioned to sandwich the high-strength portion 12A as determined along the direction in which the first ridges 123 extend (see FIG. 9D, for example). The yield strength of the high-strength portions 11A and 12A is not less than 500 MPa. The yield strength of the low-strength portions 11B and 12B is 60 to 85% of that of the high-strength portions 11A and 12A. The high-strength portions and low-strength portions of the grooved member 31 may be constructed similarly to the high-strength portions and low-strength portions of the structural member 10 shown in one of FIGS. 2 and 5 to 8.

In the implementation shown in FIG. 9A, the first and second side walls 11 and 12 are parallel to each other. On the other hand, in the implementation shown in FIG. 9B, the first and second side walls 11 and 12 are not parallel to each other. In the implementation shown in FIG. 9B, the first and second side walls 11 and 12 extend to be more distant as it goes away from the top portion 13. In this implementation, the first side wall 11 extends in the direction perpendicular to the top portion 13. The second side wall 12 extends in a direction angled relative to an axis perpendicular to the top portion 13. The flange 14 extends outward from the other edge of the first side wall 11, which is adjacent to the closing plate 2. The structural member having a cross section as shown in FIG. 9A may be employed in an A-pillar, for example.

In each of the implementations shown in FIGS. 9A and 9B, the closing plate 2 includes a bent portion that is bent outward of its surface. A ridge 2abh is provided in the bent portion of the closing plate 2, and the direction in which this ridge extends (i.e. y-direction) is the same as the direction in which the borderline between the contact surface portion 1dh of the side wall 12 which is in contact with the closing plate 2 and the surface portion of the wall which is not in contact with the closing plate 2. The direction in which the ridge 2abh in the bent portion of the closing plate 2 extends may be the same in which the first ridges 123 extend.

In the implementation shown in FIG. 9C, none of the two side walls 11 and 12 is bent. That is, the contact surface portion 1dr of the side wall 11 which is in contact with the closing plate 2 extends in the same direction as the side wall 11. The contact surface portion 1dh of the side wall 12 which is in contact with the closing plate 2 extends in the same direction as the side wall 12.

The closing plate 2 includes two contact portions 2br and 2bh that overlap, and are in contact with, the grooved member 31 and an intermediate portion 2a located between the two contact portions 2br and 2bh. The portions of the plate located between the intermediate portion 2a and the two contact portions 2*br* and 2*bh* are bent. The ridges 2*abr* and 2*abh* between the intermediate portion 2*a* and the two contact portions 2*br* and 2*bh* extend in the same direction as the borderlines between the contact surface portions 1*dr* and 1*dh* of the side walls 11 and 12 which are in contact with the closing plate 2 and the surface portions of the side walls 11 and 12 which are not in contact with the closing plate 2.

The structural members 10*g*, 10*h* and 10*i* shown in FIGS. 9A to 9C provide the same effects as the structural member 10 shown in FIGS. 2A to 2C. The joints 3*r* and 3*h* are not limited to welds. For example, the joint may be a fastening member such as a screw, an adhesive or a bonded portion such as a brazed portion. Further, in the above-illustrated implementations, the heights HR and HL of the side walls 11 and 12 are measured in the direction perpendicular to the top portion 13. In such implementations, the structural member is further prevented from being deformed when the top portion 13 receives an impact. Similar to the structural member 10 shown in FIG. 2A to 2C, the structural members 10*g* and 10*h* shown in FIGS. 9A and 9B are not limited to particular strengths of, and particular strength distributions in, the flange 14. Further, in each of the structural members 10*g*, 10*h* and 10*i* shown in FIGS. 9A to 9C, the portions of the grooved member 31 that are closer to the edges than the joint 3*h* is not limited to particular strengths and strength distributions. These portions are equivalent with the flange 14, and the strength of and strength distribution in these portions do not significantly affect the performance of the structural members 10*g*, 10*h* and 10*i*.

In the implementation shown in FIGS. 2A to 2C, the structural member 10 extends straight in the longitudinal direction. Alternatively, the structural member 10 may be curved. For example, the structural member 10 may be curved to be convex on the top portion 13 or closing plate 2. That is, the structural member 10 may be curved such that the outer surface of the top portion 13 or closing plate 2 is convex.

Figure 10A:
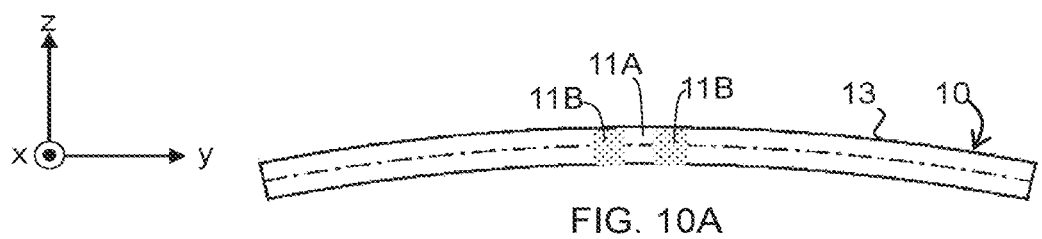
FIG. 10A is a side view of an exemplary curved structural member.
Figure 10B:
FIG. 10B is a side view of an exemplary curved structural member.
Figure 10C:
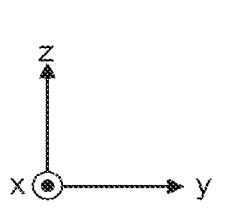
FIG. 10C is a side view of an exemplary curved structural member.
Figure 10C:
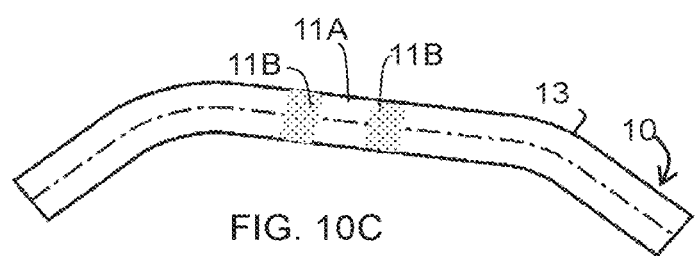
Figure 10D:
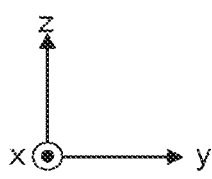
FIG. 10D is a side view of an exemplary curved structural member.
Figure 10D:
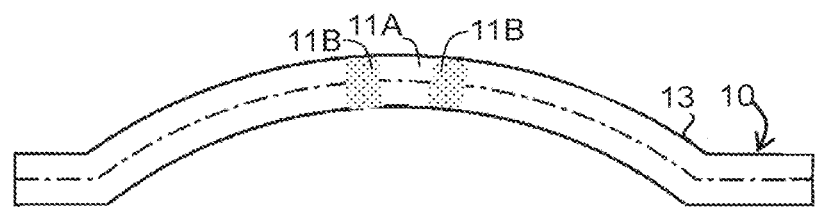

FIGS. 10A to 10D are side views of example implementations of the structural member 10 that are curved along the longitudinal direction. In the implementations shown in FIGS. 10A to 10D, the structural member 10 is curved to be convex on the top portion 13. In FIG. 10A, the structural member 10 is curved with a constant curvature along the entire length. In FIGS. 10B and 10C, the curvature varies depending on the position as determined along the longitudinal direction of the tubular portion of the structural member 10. In FIG. 10D, a longitudinal section of the structural member 10 is curved. In the implementations shown in FIGS. 10A and 10D, the structural member 10 is curved so as to be left-right symmetrical as viewed in a direction perpendicular to the side walls 11 and 12 (x-direction). In FIGS. 10B, 10C and 10D, the structural member 10 includes a portion that is curved (i.e. curved portion) and a portion extending along a straight line (i.e. straight portion). In the implementation shown in FIG. 10C, curved portions are positioned on both ends of the straight portion as determined along the longitudinal direction. That is, a straight portion is positioned between the curved portions. In the implementation shown in FIG. 10D, straight portions are positioned on both ends of the curved portion as determined along the longitudinal direction.

Curving the structural member 10 as discussed above improves the impact resistance to an impact in the direction opposite to the convex direction of the curve. For example, a structural member including a curved structural member 10 with its both ends supported has a high impact resistance to an impact in the direction opposite to the convex direction of the curve.

In each of the implementations shown in FIGS. 10A and 10D, the pair of low-strength portions 11B of a side wall 11 and a high-strength portion 11A therebetween are located in the curved portion of the structural member 10. In each of the implementations shown in FIGS. 10B and 10C, the pair of low-strength portions 11B of a side wall 11 and the high-strength portion 11A therebetween are located in the straight portion of the structural member 10. If the low-strength portions 11B and high-strength portion 11A are to be located in a straight portion, it is desirable that the high-strength portion 11A be located in the middle of the straight portion. Thus, the high-strength portion 11A is located in a portion where a high moment is caused by a received impact, thereby providing a high impact resistance.

[Applications in Vehicles]

As discussed above, if the structural member 10 is used as a structural member for a vehicle, the structural member 10 may be supported by two connections separated in the longitudinal direction of the tubular portion and, with this condition kept, may be attached to the vehicle. The structural member 10 may serve as a structural member in a vehicle body, a bumper or a vehicle door, for example. Thus, a vehicle body, bumper or vehicle door including the structural member 10 is contemplated by the present invention.

In one side wall 11 of the structural member 10 supported at two connections, a pair of low-strength portions 11B separated in the longitudinal direction and a high-strength portion 11A therebetween may be positioned between the two connections. Similarly, a high-strength portion 12A and low-strength portions 12B are provided in the other side wall 12 which faces the side wall 11. This prevents sharp bending of portions of the structural member 10 where a large moment is generated when an impact has been applied. This will provide a structural member with high impact resistance.

Particularly, moment tends to be large when an impact is applied to central portions of a member. In view of this, it is desirable that the high-strength portions 11A and 12A be positioned at the position that is equally distant from the two connections (i.e. middle between the two connections). Further, it is desirable that a structural member 10 include high-strength portions 11A and 12A located in the middle along the direction in which the first ridges 123 extend, with its both ends supported. Arrangements where both ends are supported include implementations where both ends of the structural member 10 are supported and implementations where portions of the structural member 10 located near their both ends are supported.

If a structural member 10 is mounted on a vehicle, the structural member 10 is usually positioned such that the longitudinal profile of the tubular portion of the structural member 10 extends along the outer shape of the vehicle. That is, the structural member 10 is usually mounted on the vehicle such that an impact derived from a crash of the vehicle is in a direction perpendicular to the longitudinal direction of the structural member 10. Further, the structural member 10 may be mounted on the vehicle such that the top portion 13 is located on the outside of the vehicle and the closing plate 2 is located toward the interior of the vehicle. In such cases, high-strength portions 11A are positioned between the connections, i.e. in the middle of the structural member 10, and low-strength portions 11B are positioned to sandwich them. As such, when the structural member 10 receives an impact from outside the vehicle, the structural member 10 protrudes inwardly of the vehicle to a smaller extent. Conversely, the closing plate 2 may be positioned on the outside of the vehicle. In such cases, too, high-strength portions 11A are positioned between the connections, i.e. in the middle of the structural member 10, and low-strength portions 11B are positioned to sandwich them. In implementations where the closing plate 2 is positioned on the outside of the vehicle, too, when the structural member 10 receives an impact from outside the vehicle, the structural member 10 protrudes inwardly of the vehicle to a smaller extent.

The structural member 10 may be curved, as discussed above. In such cases, the structural member 10 may be mounted on the vehicle to be convex toward the outside of the vehicle. Thus, when the structural member 10 receives an impact from outside the vehicle, the member is less likely to be bent sharply.

The structural member 10 may serve as a structural member constituting part of a vehicle body, a bumper or a vehicle door. For example, the structural member 10 may be used as a member constituting part of the vehicle body, such as an A-pillar, a B-pillar, a side sill, a roof rail, a floor member, and a front side member. Alternatively, the structural member 10 may be used as a member to be mounted on the vehicle body, such as a door impact beam or a bumper, to protect devices or passengers in the vehicle from an impact from the outside.

Figure 11:
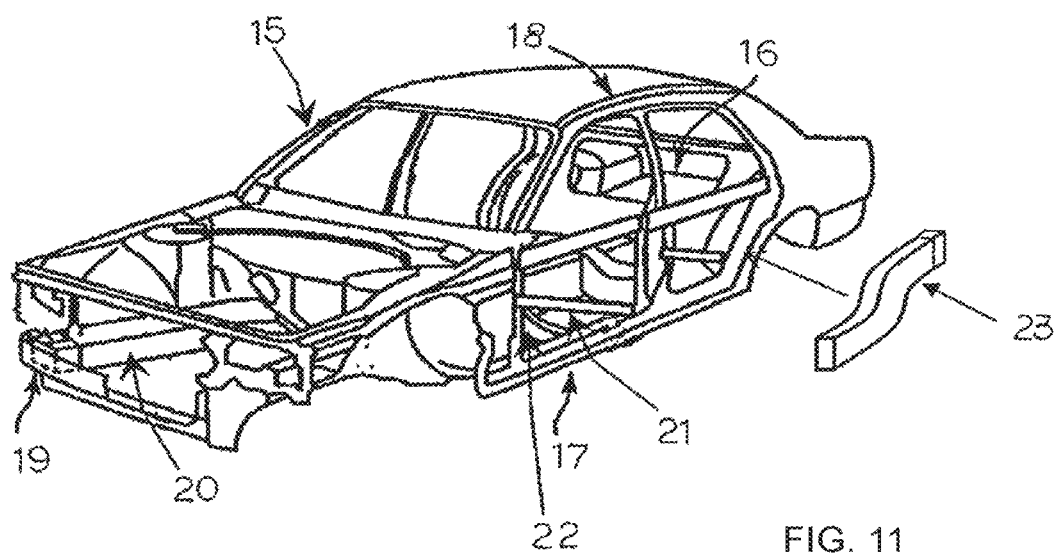
FIG. 11 shows an exemplary structural member mounted on a vehicle.

FIG. 11 shows an exemplary structural member mounted on a vehicle that uses a monocoque structure. In the implementation shown in FIG. 11, an A-pillar 15, a B-pillar 16, a side sill 17, a roof rail 18, a bumper beam 19, a front side member 20, a door impact beam 21, a floor member 22 and a rear side member 23 are used as vehicle structural members. At least one of these vehicle structural members may be constituted by the structural member 10 discussed above.

If the structural member 10 is applied to the bumper beam 19, the structural member 10 is constructed such that its both ends are supported by the front side member 20. In this construction, the moment of a load is at its maximum when an impact is applied to the middle of the bumper beam 19. High-strength portions 11A and 12A are positioned in the middle of the bumper beam 19 as determined along its longitudinal direction, and low-strength portions 11B and 12B are positioned to sandwich them. This will prevent the bumper beam 19 from being bent sharply by an impact on the middle of the bumper.

If the structural member 10 is applied to the door impact beam 21, brackets may be provided on both ends of the structural member 10. The structural member 10 may be mounted on the door frame using the brackets on both ends. In such cases, too, sharp bending of portions where the largest moment is generated upon reception of an impact will be prevented if the high-strength portions 11A and 12A are positioned in the middle of the structural member 10 as determined along the longitudinal direction, that is, the high-strength portions 11A and 12A are positioned in the middle of the structural member 10 forming the door impact beam 21, i.e. between the ends of the member, which serve as coupling portions.

These effects are significant when the structural member 10 constituting a structural member of a vehicle is made of an ultrahigh strength steel with a tensile strength (i.e. tensile strength of the portions other than the low-strength portions 11B and 12B) not less than 780 MPa (or a yield strength not less than 400 MPa). The effects are still more significant when the portions of the structural member 10 other than the low-strength portions 11B and 12B have a strength represented by a tensile strength not less than 980 MPa (or yield strength not less than 500 MPa). The material of the structural member 10 is not limited to steel. For example, the structural member 10 may be made of aluminum or other metals.

Vehicles to which the structural member 10 may be applied are not limited to four-wheeled vehicles like the automobile shown in FIG. 11. For example, the structural member 10 may be used as a structural member for a two-wheeled vehicle. The structural member 10 may be applied to not only vehicles using a monocoque structure, but also vehicles using a frame structure. Applications of a structural member constituted by the structural member 10 are not limited to vehicles. For example, the structural member 10 may be used as a structural member of an impact-resistant container, a building, a ship, an airplane, or the like.

The manners in which the structural member 10 is used are not limited to implementations where both ends of the structural member 10 are connected to another member. Another member may be connected to arbitrary two positions on the structural member 10 that are distant by 6H or more in the direction in which the first ridges 123 extend. That is, the two connections may be disposed at arbitrary positions on the structural member 10, which are not limited to both ends of the member.

[Manufacturing Process]

The structural member 10 may be entirely formed from the same material. The structural member 10 may be formed from a steel plate, for example. The process of manufacturing the structural member 10 includes the steps of; fabricating a hat member 1 having low-strength portions 11B and 12B and high-strength portions 11A and 12A; fabricating a closing plate 2; and joining the hat member 1 to the closing plate 2. The step of fabricating a hat member 1 includes providing differences in strength to the material to form low-strength portions. Further, the manufacturing process may also include the step of making the hat member 1 and closing plate 2 curved. If the hat member 1 and closing plate 2 are to be made curved, for example, bending methods may be used such as press bending, stretch bending, compression bending, roll bending, MOS bending or eccentric plug bending.

The process for manufacturing the structural member 10 includes the step of forming low-strength portions in a material. The method of forming the low-strength portions is not limited to any particular one; for example, a steel plate may be deformed by roll forming to have a hat-shaped cross section, and the material may then be locally heated and quenched by a method such as a laser method or high-frequency heating to create a hat member 1 including hardened portions. In such cases, the portions that have not been quenched provide low-strength portions with relatively low strength. Alternatively, thermal refining may be performed to strengthen an entire hat member 1, which is then locally annealed to form low-strength portions.

Alternatively, the structural member 10 may be fabricated by hot-press forming (or hot stamping). During hot-press forming, portions of one and the same material may be subjected to different conditions of heating or cooling to provide low-strength portions in the material. For example, a steel plate may be heated to or above a temperature at which steel forms an austenite single-phase region (Ac3 temperature) and may be quenched while being molded. During this, different cooling rates may be used such that rapidly cooled portions generally form hard martensite and slowly cooled portions form a soft mixed-phase microstructure of ferrite and pearlite or bainite. Thus, the slowly cooled portions provide low-strength regions. Further, the entire member may be subjected to hot-press forming to form high-strength portions of martensite, and portions may then be tempered to form low-strength portions.

The structural member 10 may be manufactured by other methods. For example, tailored blank or other known methods may be used to form the structural member 10 with low-strength portions.

In the structural member 10 discussed above, the distribution of yield strength in the high-strength portions 11A and 12A may not be uniform. In a stationary range, the variation in yield strength is normally within ±10%. For the purposes of the present application, 90% of the maximum, S max, of yield strength in the high-strength portions 11A and 12A defines the yield strength SA (or reference strength) of the high-strength portion 11A or 12A, SA (SA=0.9 S max). The range of yield strengths larger than 0.85 SA and smaller than 0.9 SA (i.e. 85% to 90% of SA) (transitional range) is deemed to be part of the high-strength portion 11A or 12A. Yield strength in the high-strength portions 11A and 12A is larger than 0.85 SA (i.e. 85% of SA). That is, the range of yield strengths larger than 0.85 SA represents the high-strength portion 11A or 12A.

Figure 12:
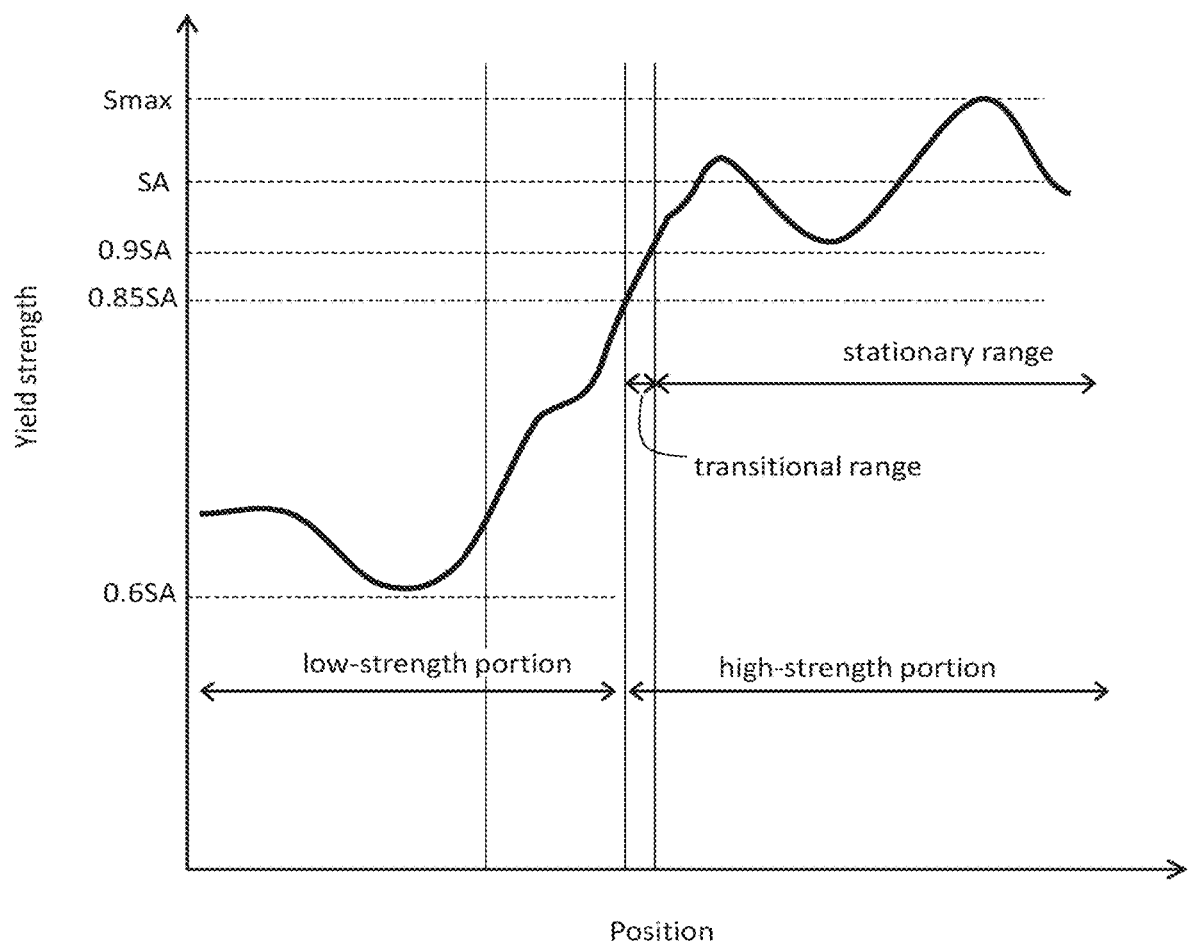
FIG. 12 shows an exemplary distribution of yield strength in a portion of the structural member including the border between a low-strength portion and the high-strength portion.

FIG. 12 shows an example of the distribution of yield strength in a portion of the member including the border between a low-strength portion 11B or 12B and a high-strength portion 11A or 12A. In FIG. 12, the longitudinal axis represents yield strength, while the horizontal axis represents the position in the y-direction. In the example of FIG. 12, 90% of the maximum S max of yield strength in the high-strength portion (0.9 S max) defines the yield strength SA of the high-strength portion. In the high-strength portion, the range of yield strengths not less than 0.9 SA is referred to as constant range. Further, the range of yield strengths more than 0.85 SA and less than 0.95 SA is a transitional range that stretches between the low-strength portion and the constant range of the high-strength portion. The transitional range is deemed to be included in the high-strength portion, and the position of the yield strength of 0.85 A represents the border between the low-strength portion and high-strength portion. That is, the range of yield strengths more than 0.85 SA forms the high-strength portion, while the range of yield strengths not more than 0.85 SA forms the low-strength portion.

The yield strength of the low-strength portion is not less than 0.6 SA and not more than 0.85 SA (60 to 85% of SA). Even if the structural member 10 includes some portions surrounded by a low-strength portion and having a strength not more than 0.6 SA, they are deemed to be part of the low-strength portion 11B or 12B if they are small enough that their influence on the deformation behavior of the structural member 10 is negligible.

EXAMPLES

Figure 13A:
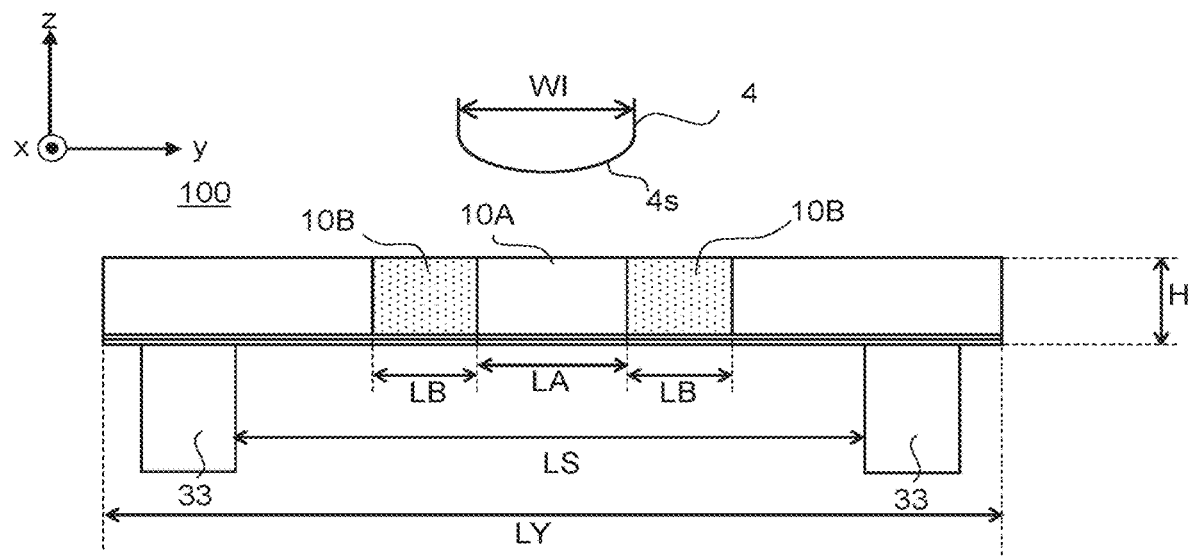
FIG. 13A shows an analysis model in a simulation.

The present examples used simulations to analyze the deformation of each of structural members having a hat member and closing plate occurring when an indenter was caused to hit the structural member. FIG. 13A shows the configuration of an analysis model in the simulations. In the present simulations, a structural member 100 was placed on two stands 3 so as to stretch over and between them and, with this condition kept, an indenter (impacter) 4 was caused to hit the middle of the structural member 100 as determined along its longitudinal direction, and the deformation behavior was analyzed.

Figure 13B:
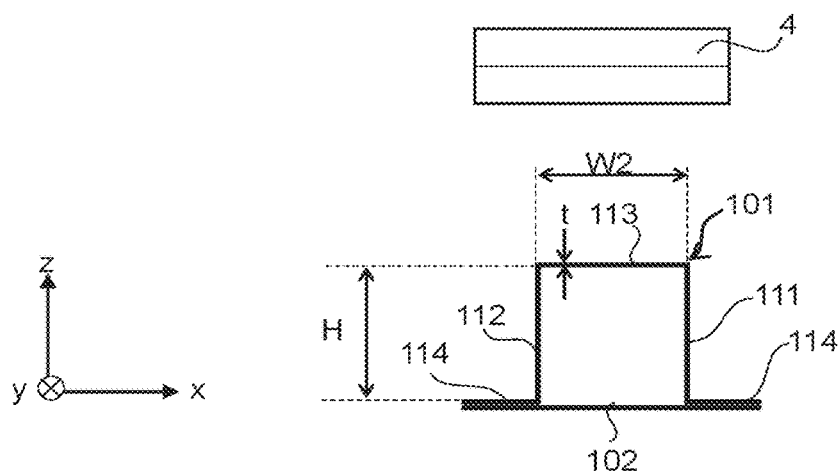
FIG. 13B shows an analysis model in another simulation.

FIG. 13B shows the structural member 100 shown in FIG. 13A as viewed in the y-direction. The structural member 100 includes a hat member 101 and a closing plate 102. The hat member 101 includes a top portion 113, a pair of side walls 111 and 112 extending from both edges of the top portion 113 and facing each other, and flanges 114 extending from the edges of the side walls 111 and 112 opposite to those adjacent to the top portion 113, outwardly as determined along the direction in which the side walls are arranged. The closing plate 102 is joined to the flange 114. Using the models shown in FIGS. 13A and 13B, simulations were conducted where the indenter 4 was moved in the z-direction and caused to hit the top portion 113 and where the indenter 4 was moved in the z-direction and caused to hit the closing plate 102.

The mass of the indenter 4 was 350 kg; the width WI of the indenter 4 as measured in the y-direction was 160 mm; the radius of curvature R of the impact surface 4s of the indenter 4 was 150 mm; and the initial speed of the indenter 4 was 4 m/sec. The coefficient of friction was 0.1. As measured in a cross section of the structural member 100, the width W2 of the top portion was 50 mm and the height H of each of the side walls 111 and 112 was 50 mm. The plate thickness t of the structural member 100 was 1.4 mm, the value R of the structural member 100 was 5 mm, and the length LY of the structural member 100 as measured in the direction in which the first ridges extend (y-direction) which formed the borders between the side walls 111 and top portion 113 was 1000 mm. The distance LS between the stands 3 was 400 mm.

A high-strength portion 10A was provided in each of the side walls 111 and 112 and low-strength portions 10B were provided to sandwich the high-strength portion 10A as determined along the y-direction. The high-strength portion 10A was positioned in the middle of the structural member 10 as determined along the longitudinal direction thereof. The indenter 4 was caused to hit the top portion 113. The length LY of the structural member 100 as measured in the y-direction thereof was six or more times the height H of the side walls 111 and 112 (LY≥6H).

Figure 13C:
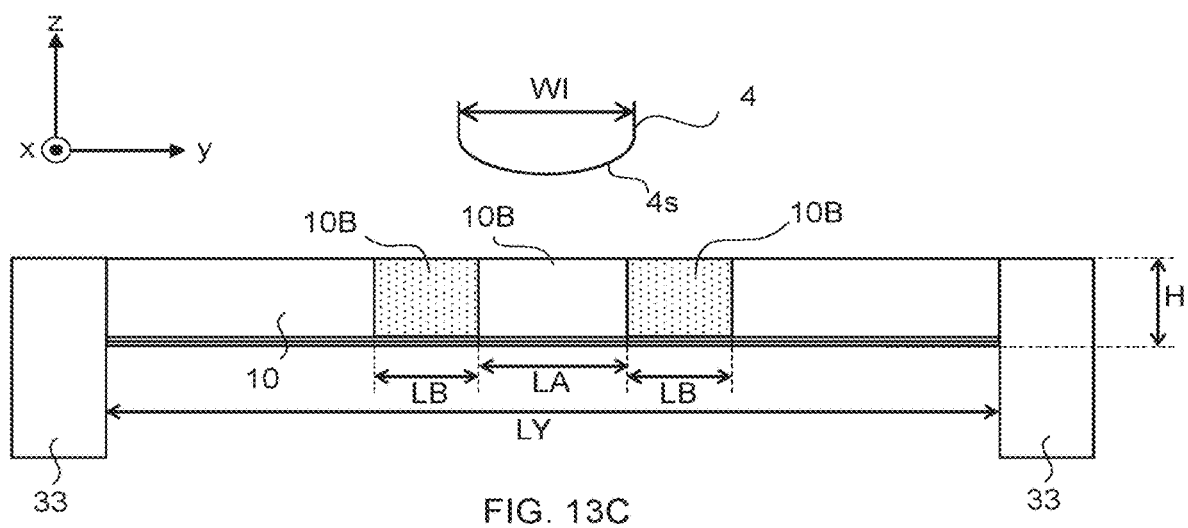
FIG. 13C shows an analysis model in another simulation.

FIG. 13C shows the configuration of another analysis model in the simulations. In the example of FIG. 13C, both ends of the structural member 100 were joined to the two stands 3. The results of the simulation of the analysis model of FIG. 13C were similar to those of the simulation of the analysis model of FIG. 13A. In addition to the simulations where the indenter 4 was caused to hit the top portion 113, simulations where the indenter 4 was caused to hit the closing plate 102 were conducted.

Impact simulations were conducted where the yield strength of the low-strength portions 10B was 100 kgf/mm$^2$, and the yield strength of the other portions including the high-strength portions 10A was 120 kgf/mm$^2$ (the strength ratio of low-strength portions 10B relative to the high-strength portions 10A being about 0.83), with different sizes LA of the high-strength portions 10A and different sizes LB of the low-strength portions 10B.

Table 1 given below shows deformation behavior values obtained from the simulation results where the strength ratio discussed above was 0.83 (the yield strength of the low-strength portions 10B being YP 100 kgf/mm$^2$ and the yield strength of the other portions including the high-strength portions 10A being YP 120 kgf/mm$^2$), with different sizes LA of the high-strength portions 10A and different plate thicknesses t of the structural member 100. In Table 1, "Excellent" in the column labeled "Deformation behavior" means very good behavior, "Good" means good behavior, and "Poor" means poor behavior. These evaluations of deformation behaviors were made based on the amount of intrusion by the indenter. "Poor" means that the member broke early during deformation. The same applies to the meanings of "Excellent", "Good" and "Poor" in Table 5 provided below. The amount of intrusion by the indenter may also be referred to as impacter stroke or indenter displacement. Table 1 shows the results of analyses obtained when the indenter 4 was caused to hit the top portion 113. The results of analyses obtained when the impacter 4 was caused to hit the closing plate 102 were generally the same as in Table 1.

TABLE 1

| Case | LA | t [mm] | Deformation behavior |
|---|---|---|---|
| 1 | 0 | 1.4 | Poor |
| 2 | 2H/3 | 1.4 | Good |
| 3 | H | 1.4 | Excellent |
| 4 | 4H/3 | 1.4 | Excellent |
| 5 | 2H | 1.4 | Good |
| 6 | 8H/3 | 1.4 | Good |
| 7 | 3H | 1.4 | Good |
| 8 | 10H/3 | 1.4 | Poor |
| 9 | 4H | 1.4 | Poor |
| 10 | 2H | 1.0 | Good |
| 11(=5) | 2H | 1.4 | Good |
| 12 | 2H | 1.8 | Good |

Figure 14:
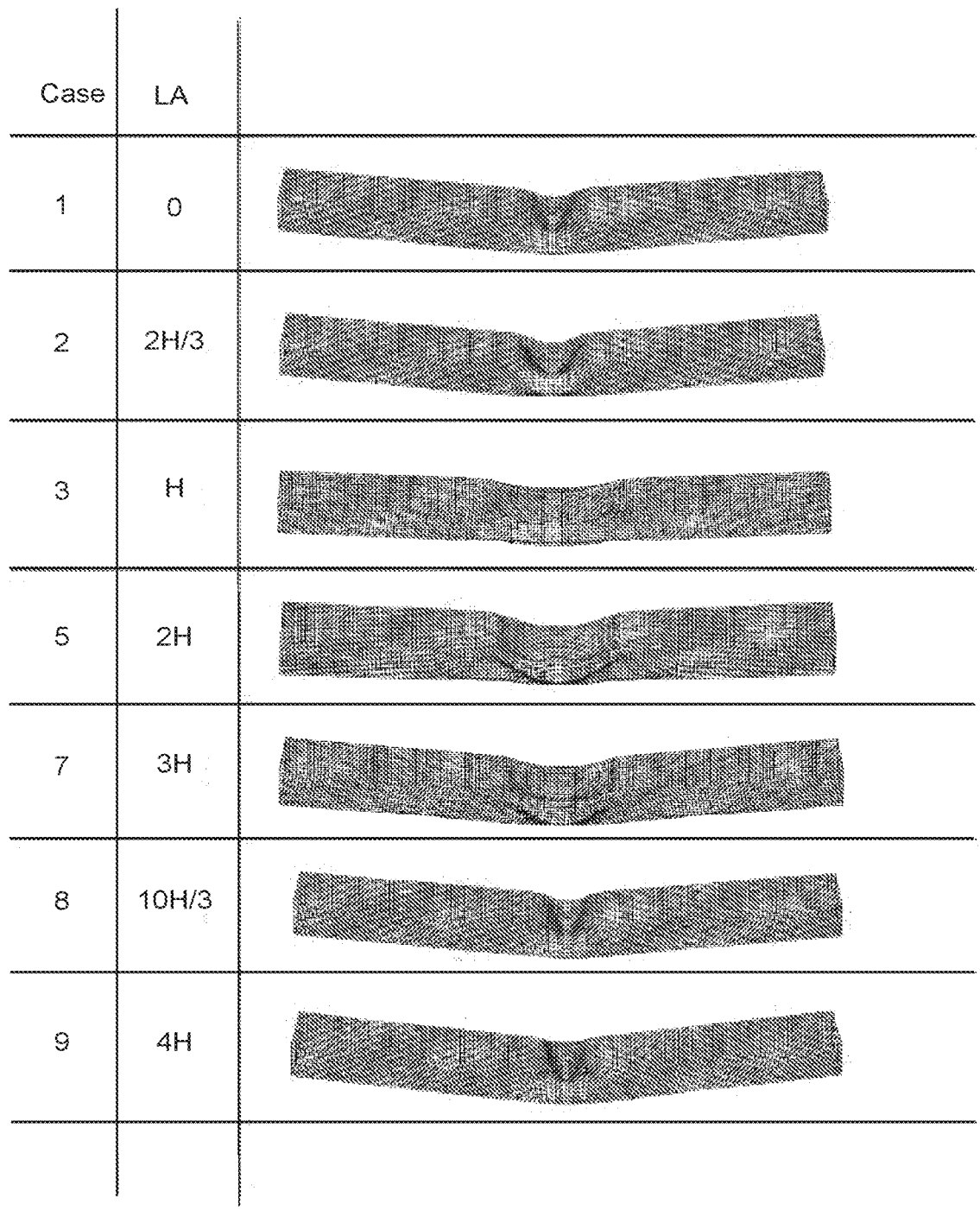
FIG. 14 shows a result of a simulation of the deformation of a structural member.

FIG. 14 shows the results of simulations of how the structural member 100 deformed when the amount of intrusion by the indenter 4 was 40 mm. FIG. 14 shows how the structural member 100 deformed for each of Cases 1 to 3, 5 and 7 to 9 shown in Table 1. The results shown in FIG. 14 show that the portion deformed by an impact for each of Cases 2, 3, 5 and 7, i.e. 2H/3≤LA≤3H, was wider than that for each of the other cases, i.e. Cases 1, 8 and 9. That is, in Cases 1, 8 and 9, a deformation mode referred to as "sharp-bending" occurred, where the bent portion protruded sharply. In Cases 2, 3, 5 and 7, a deformation mode referred to as "cross-section crush" occurred, where the top portion, which received an impact, and portions of the side walls were crushed by an impact.

Figure 15A:
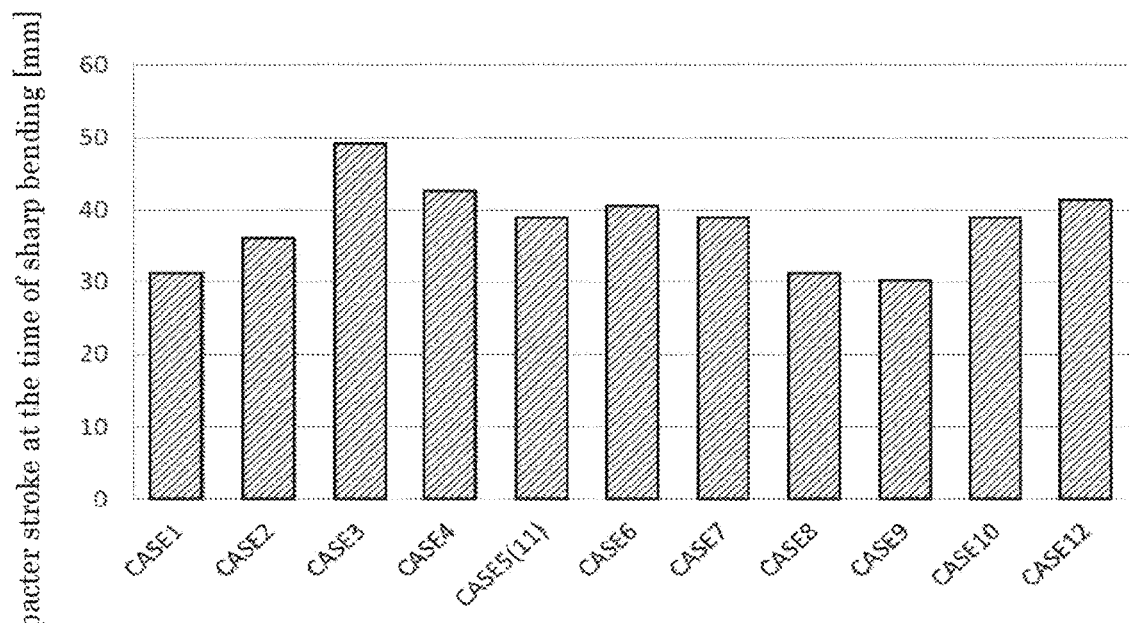
FIG. 15A is a graph showing results of simulations of the impacter stroke found when a sharp bend occurs.
Figure 15B:
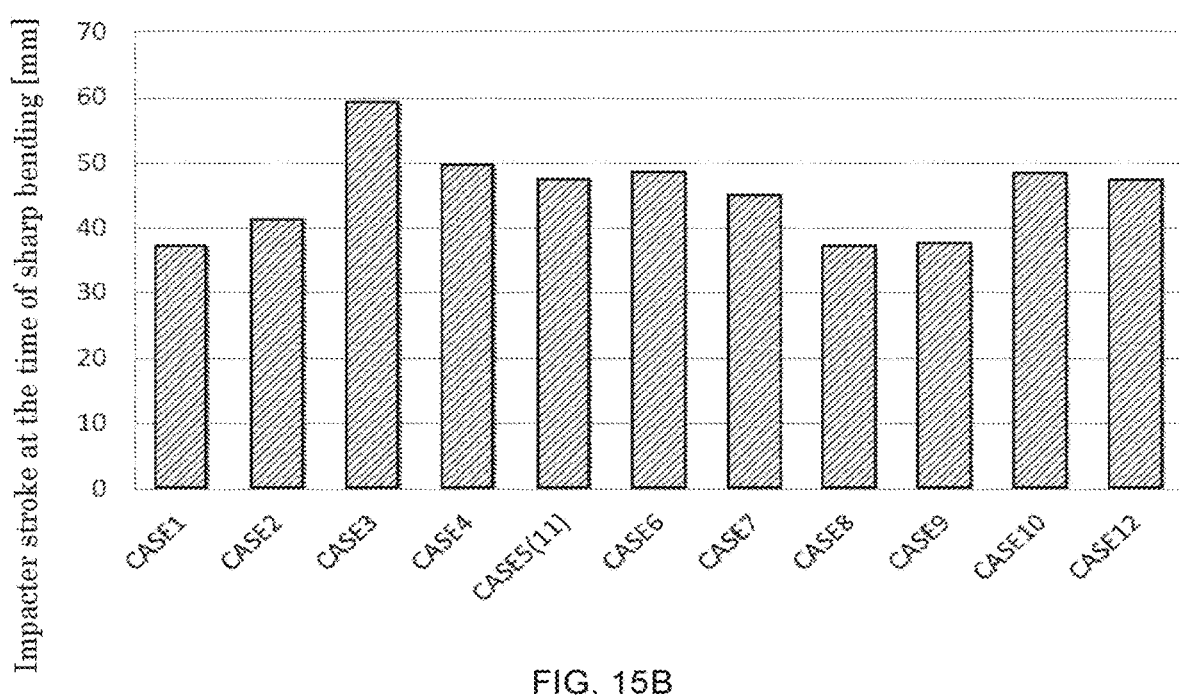
FIG. 15B is a graph showing results of simulations of the impacter stroke found when a sharp bend occurs.

FIG. 15A is a graph showing the results of the simulations of the impacter stroke at the time of sharp bending for Cases 1 to 12 in Table 1. FIG. 15A shows the results of simulations obtained when the indenter 4 was caused to hit the top portion 113. FIG. 15B shows the results of simulations obtained when the indenter 4 was caused to hit the closing plate 102. The size LA and thickness t for each of Cases 1 to 12 in FIG. 15B are the same as the size LA and thickness t for each of Cases 1 to 12 shown in Table 1.

In the results shown in FIGS. 15A and 15B, the impacter stroke at the time of sharp bending was larger for Cases 2 to 7 and 10 to 12 than for Case 1 (i.e., when no low-strength portions 10B were provided). This shows that sharp bending is less likely to occur for Cases 2 to 7 and 10 to 12 than when no low-strength portions 10B were provided. Further, the impacter stroke at the time of sharp bending is higher for Cases 3 to 7, i.e. when H≤LA≤3H, than for other cases. This shows that sharp bending is particularly unlikely to occur for Cases 3 to 7. Further, for Cases 3 and 4, i.e. where H≤LA≤4H/3, the impacter stroke was prominently high, further preventing sharp bending.

The impacter strokes found when an impact was applied to the closing plate 102 (FIG. 15B) are larger than the impacter strokes found when an impact was applied to the top portion 113 (FIG. 15A). For the cases in FIG. 15B, the flange 114 was present on the inner bent side (side at which sharp bending begins) of the structural member 100, which reduced a decrease in the toughness of the structural member 100 derived from its bending deformation compared with the cases in FIG. 15A, thereby making sharp bending less likely.

Figure 16:
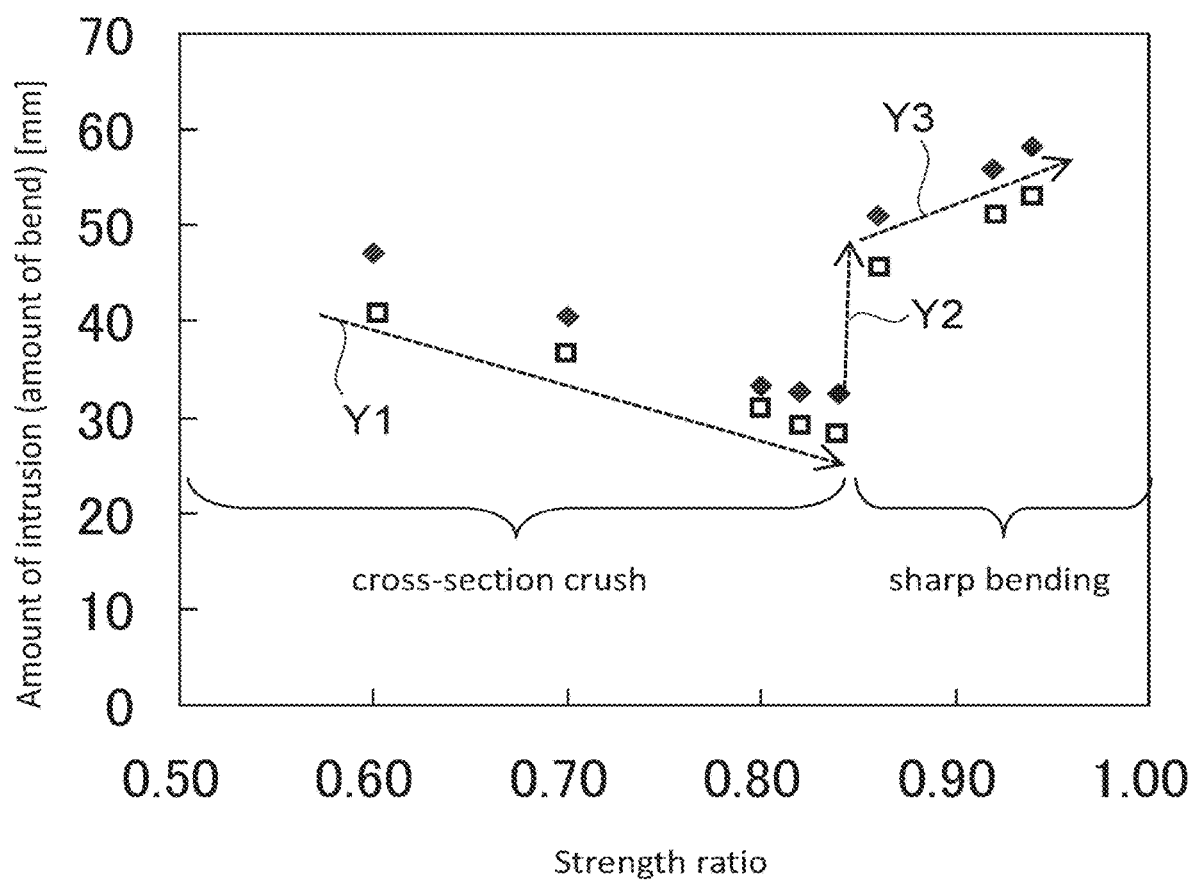
FIG. 16 is a graph showing the amount of deformation due to bend deformation found when an impact load is input with different strength ratios between the low-strength portions and high-strength portion.

Impact simulations were conducted with different ratios between the strength of the low-strength portions 10B and the strength of the other portions including the high-strength portions 10A. FIG. 16 is a graph showing the amount of deformation associated with the bending deformation found when impact loads were input with different strength ratios between the low-strength portions 10B and the other portions including the high-strength portions 10A. In FIG. 16, the vertical axis indicates the amount of intrusion in (or amount of protrusion of) the structural member 10 as measured in the direction of an impact (z-direction). The horizontal axis indicates the ratio of the strength of the low-strength portions 10B to the strength of the high-strength portions 10A (strength ratio=strength of low-strength portions/strength of high-strength portions). In the graph of FIG. 16, the plotted rhombuses indicate results obtained when the yield strength of the high-strength portions was YS 120 kgf/mm$^2$, while the plotted quadrangles indicates results obtained when the yield strength of the high-strength portion was 145 kgf/mm$^2$.

In the section with strength ratios of 0.60 to 0.85, the amount of intrusion decreased as strength ratio increased (arrow Y1). In this section, the deformation mode of the structural member 10 was cross-section crush. Within this section, when the strength of the low-strength portions 10B was low (strength ratio was not higher than 0.60), the deformation was cross-section crush but with a large amount of intrusion, substantially equal to the amounts of intrusion for strength ratios of 0.85 and higher. When strength ratio exceeded 0.85, the amount of intrusion rapidly increased (arrow Y2). Further, when strength ratio increased in the section of strength ratios of 0.85 and higher, the amount of intrusion increased as strength ratio increased (arrow Y3). This is presumably because, at the border strength ratio of 0.85, the deformation mode transitioned from cross-section crush to sharp bending. Thus, when the strength of the low-strength portions 10B was too high (i.e. strength ratio was high), the pipe was deformed with sharp bending, resulting in large amounts of intrusion. The results shown in FIG. 16 confirm that, to reduce the amount of intrusion associated with the sharp bending caused by an impact, strength ratio is preferably 60 to 85%, and more preferably 70 to 85%.

Table 2 given below shows deformation behavior values obtained from the simulation results where each low-strength portion 10B extended a portion of the associated side wall as determined along the height direction of the side wall, as shown in FIG. 6A. In these simulations, the dimension LA of the high-strength portions 10A as measured in the direction in which the first ridges extend was equal to the height H of the side walls (LA=H) and the dimension LB of the low-strength portion 10B as measured in the direction in which the first ridges extend was (⅗)H, and the distance hb between the associated flange and the low-strength portion 10B as measured in the height direction of the side wall was H/5. The distance h between the top portion and low-strength portion 10B as measured in the height direction of the side walls was changed stepwise, and the indenter 4 was caused to hit the top portion 113 for each step of the height h. The results shown in Table 2 demonstrate that very good deformation behavior was obtained when the distance h between the top portion and the low-strength portions 10B as measured in the height direction of the side walls was 0 and H/5, and good deformation behavior was obtained when the distance h was H/4.

TABLE 2

| h | Deformation behavior |
|---|---|
| 0 | Excellent |
| H/5 | Excellent |
| H/4 | Good |
| H/3 | Poor |

Table 3 given below shows deformation behavior values obtained from the simulation results where each high-strength portion 10A extended from the associated flange to a position distant from the flange by ha as measured in the height direction of the side wall and a low-strength portion was present between each high-strength portion 10A and the top portion. In these simulations, the dimension LA of the high-strength portions 10A as measured in the direction in which the first ridges extend was equal to the height H of the side wall (LA=H) and the dimension LB of the low-strength portions 10B as measured in the direction in which the first ridges extend was $(3/5)H$. The dimension ha of the high-strength portions 10A as measured in the height direction of the side wall was changed stepwise, and the indenter 4 was caused to hit the top portion 113 for each step of the dimension ha. The results shown in Table 3 demonstrate that very good deformation behavior was obtained when the distance ha was 4H/5 or more and good deformation behavior was obtained when the distance ha was 3H/5.

TABLE 3

| ha | Deformation behavior |
|---|---|
| H/2 | Poor |
| 3H/5 | Good |
| 4H/5 | Excellent |
| H | Excellent |

Table 4 given below shows deformation behavior values obtained from the simulation results where each low-strength portion 10B extended a portion of the associated side wall as determined along the height direction of the side wall, as shown in FIG. 6B. The low-strength portions 10B were provided in contact with the top portion. In these simulations, the dimension LA of the high-strength portions 10A as measured in the direction in which the first ridges extend was equal to the height H of the side walls (LA=H) and the dimension LB of the low-strength portions 10B as measured in the direction in which the first ridges extend was $(3/5)H$. The distance hb between the flanges and low-strength portions 10B was changed stepwise and the indenter 4 was caused to hit the top portion 113 for each step of the distance hb. The results shown in Table 4 demonstrate that very good deformation behavior was obtained when the distance hb between the flanges and low-strength portions 10B as measured in the height direction of the side walls was H/7, H/5 or H/2, and good deformation behavior was obtained when the distance hb was 4H/5.

TABLE 4

| hb | Deformation behavior |
|---|---|
| H/7 | Excellent |
| H/5 | Excellent |
| H/2 | Excellent |
| 4H/5 | Good |
| H | Poor |

Table 5 given below shows the results of analyses of deformation behavior of the structural member in simulations using the model shown in FIG. 13C, found when the dimension LB of the low-strength portions 10B as measured in the direction in which the first ridges extend.

TABLE 5

| Case | LA | t [mm] | LB | Deformation behavior |
|---|---|---|---|---|
| 13 | H | 1.4 | 2H/5 | Poor |
| 14 | H | 1.4 | 3H/5 | Excellent |
| 15 | H | 1.4 | H | Excellent |
| 16 | H | 1.4 | 2H | Excellent |

Figure 17:
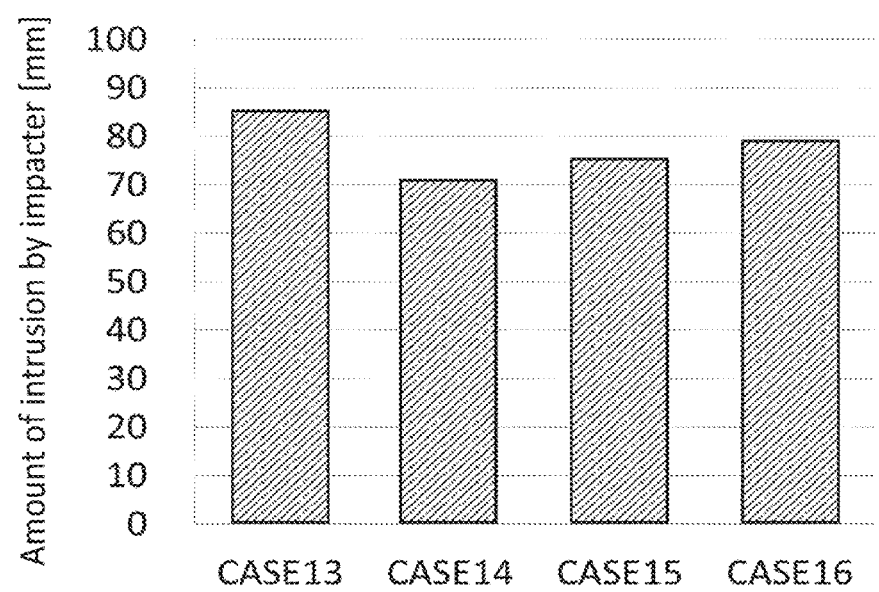
FIG. 17 is a graph showing results of simulations of the impacter stroke.

The graph shown in FIG. 17 shows the ultimate amount of intrusion of the impacter for each of Cases 13 to 16 in Table 5. The graph shown in FIG. 17 demonstrates that, for Cases 14 to 16, i.e. when the dimension LB of the low-strength portions as measured in the direction in which the first ridges extend was $(3/5)H$, H or 2H, the amount of intrusion by the impacter was smaller than when LB was $(2/5)H$. This shows that the extent of protrusion is reduced if $LB \geq (3/5)H$. It also shows that, if $(3/5)H \leq LB \leq 2H$, the amount of intrusion by the impacter was smaller and the extent of protrusion was smaller than when $LB=(2/5)H$.

Although an embodiment of the present invention has been described, the above-described embodiment is merely an example for carrying out the invention. Accordingly, the present invention is not limited to the above-described embodiment, and the embodiment may be modified appropriately without departing from the spirit of the invention.

EXPLANATION OF CHARACTERS

1: structural member
2: closing plate
11, 12: side walls
13: top portion
14: flanges
11A, 12A: high-strength portions
11B, 12B: low-strength portions

The invention claimed is:
1. A structural member comprising at least one closing plate and a hat member,
the hat member including:
a top portion;
two first ridges located on both edges of the top portion;
two flanges joined to the closing plate;
two second ridges located on edges of the two flanges; and
two side walls each located between one of the two first ridges and one of the two second ridges,
a length of a tubular portion formed by the hat member and the closing plate as measured in a direction in which the first ridges extend is 6 or more times a larger one H of dimensions of the two side walls as measured in a direction perpendicular to the top portion, and each of the two side walls includes a high-strength portion and low-strength portions, the high-strength portions of the two side walls facing each other, each high-strength portion extending a distance not less than ⅔ times the dimension H and not more than 3 times the dimension H as measured in the direction in which the first ridges extend, the high-strength portion having a yield strength not less than 500 MPa, the low-strength portions sandwiching the high-strength portion as determined along the direction in which the first ridges extend, the low-strength portions having a yield strength of 60 to 85% of that of the high-strength portion.

2. A structural member comprising at least one closing plate and a hat member,
the hat member including:
a top portion;
two first ridges located on both edges of the top portion;
two flanges joined to the closing plate;
two second ridges located on edges of the two flanges; and
two side walls each located between one of the two first ridges and one of the two second ridges,
a length of a tubular portion formed by the hat member and the closing plate as measured in a direction in which the first ridges extend is 6 or more times a larger one H of dimensions of the two side walls as measured in a direction perpendicular to the closing plate, and
each of the two side walls includes a high-strength portion and low-strength portions, the high-strength portions of the two side walls facing each other, each high-strength portion extending a distance not less than ⅔ times the dimension H and not more than 3 times the dimension H as measured in the direction in which the first ridges extend, the high-strength portion having a yield strength not less than 500 MPa, the low-strength portions sandwiching the high-strength portion as determined along the direction in which the first ridges extend, the low-strength portions having a yield strength of 60 to 85% of that of the high-strength portion.

3. A structural member comprising at least one closing plate and a grooved member,
the grooved member including:
a top portion;
two first ridges located on both edges of the top portion;
two joints joined to the closing plate; and
two side walls each located between one of the two first ridges and one of the two joints,
a length of a tubular portion formed by the grooved member and the closing plate as measured in a direction in which the first ridges extend is 6 or more times a larger one H of dimensions of the side walls as measured in a direction perpendicular to the top portion, and
each of the two side walls includes a high-strength portion and low-strength portions, the high-strength portions of the two side walls facing each other, each high-strength portion extending a distance not less than ⅔ times the dimension H and not more than 3 times the dimension H as measured in the direction in which the first ridges extend, the high-strength portion having a yield strength not less than 500 MPa, the low-strength portions sandwiching the high-strength portion as determined along the direction in which the first ridges extend, the low-strength portions having a yield strength of 60 to 85% of that of the high-strength portion.

4. A structural member comprising at least one closing plate and a grooved member,
the grooved member including:
a single top portion;
two first ridges located on both edges of the top portion;
a flange joined to the closing plate;
a single second ridge located on an edge of the flange;
a first side wall located between one of the first ridges and the second ridge;
a joint joined to the closing plate; and
a second side wall located between the other first ridge and the joint,
a length of a tubular portion formed by the grooved member and the closing plate as measured in a direction in which the first ridges extend is 6 or more times a larger one H of dimensions of the first and second side walls as measured in a direction perpendicular to the top portion,
the first side wall includes a high-strength portion and low-strength portions, the high-strength portion of the first side wall facing the second side wall and extending a distance not less than ⅔ times the dimension H and not more than 3 times the dimension H as measured in the direction in which the first ridge of the tubular portion extends, the high-strength portion having a yield strength not less than 500 MPa, the low-strength portions sandwiching the high-strength portion as determined along the direction in which the first ridge extends, the low-strength portions having a yield strength of 60 to 85% of that of the high-strength portion, and
the second side wall includes a high-strength portion and low-strength portions, the high-strength portion of the second side wall facing the first side wall and extending a distance not less than ⅔ times the dimension H and not more than 3 times the dimension H as measured in the direction in which the first ridge of the tubular portion extends, the high-strength portion having a yield strength not less than 500 MPa, the low-strength portions sandwiching the high-strength portion as determined along the direction in which the first ridge extends, the low-strength portions having a yield strength of 60 to 85% of that of the high-strength portion.

5. The structural member according to claim 1, wherein a dimension of each of the low-strength portions as measured in the direction in which the first ridge extends is not less than ⅗ times the dimension H and not more than twice the dimension H.

6. The structural member according to claim 1, wherein the high-strength portion located between the low-strength portions is positioned at a middle of the tubular portion as determined along the direction in which the first ridge extends.

7. The structural member according to claim 1, wherein, between one edge of each of the side walls located adjacent to the first ridge and another edge opposite to the first ridge, an edge of each of the low-strength portions located adjacent to the one edge of the side wall is located between the one edge of the side wall and a position of ¼ of a distance between the one edge and the other edge of the side wall as determined from the one edge toward the other edge of the side wall.

8. The structural member according to claim 7, wherein, an edge of the low-strength portion located adjacent to the other edge of the side wall is located between the other edge of the side wall and a position of ⅘ of the distance between the one edge and the other edge as determined from the other edge toward the one edge of the side wall, and a dimension of the low-strength portion as measured in a direction from the one edge toward the other edge of the low-strength portion is not less than ⅕ of the distance between the one edge and the other edge of the side wall.

9. The structural member according to claim 7, further comprising:

a region adjacent to an edge of the low-strength portion located between the one edge and the other edge of the side wall and having a yield stress higher than the low-strength portion.

10. The structural member according to claim 1, wherein, between one edge of each of the side walls located adjacent to the first ridge and another edge opposite to the first ridge, an edge of the high-strength portion located adjacent to the one edge of the side wall between the low-strength portions is located between the one edge of the side wall and a position of ⅖ of the distance between the one edge and the other edge of the side wall as determined from the one edge toward the other edge of the side wall, an edge of the high-strength portion located adjacent to the other edge of the side wall is located at the other edge of the side wall, and an additional low-strength portion having a yield strength of 60 to 85% of that of the high-strength portion is present starting at an edge of the high-strength portion located adjacent to the one edge of the side wall and ending at the one edge of the side wall.

11. The structural member according to claim 2, wherein, between one edge of the side wall opposite to the first ridge and another edge located adjacent to the first ridge, an edge of each of the low-strength portions located adjacent to the one edge of the side wall is located between the one edge of the side wall and a position of ¼ of the distance between the one edge and the other edge as determined from the one edge toward the other edge of the side wall.

12. The structural member according to claim 11, wherein, an edge of each of the low-strength portions located adjacent to the other edge of the side wall is located between the other edge of the side wall and a position of ⅘ of the distance between the one edge and the other edge of the side wall as determined from the other edge toward the one edge of the side wall, and a dimension of the low-strength portion as measured in a direction from the one edge toward the other edge of the low-strength portion is ⅕ or more of the distance between the one edge and the other edge of the side wall.

13. The structural member according to claim 11, further comprising:

a region adjacent to an edge of the low-strength portion located between the one edge and the other edge of the side wall, the region having a higher yield stress than the low-strength portion.

14. The structural member according to claim 2, wherein, between one edge of the side wall opposite to the first ridge and another edge located adjacent to the first ridge, an edge of the high-strength portion located adjacent to the one edge of the side wall between the low-strength portions is located between the one edge of the side wall and a position of ⅖ of a distance between the one edge and the other edge of the side wall as determined from the one edge toward the other edge of the side wall, an edge of the high-strength portion located adjacent to the other edge is located at the other edge of the side wall, and an additional low-strength portion having a yield strength of 60 to 85% of that of the high-strength portion is present starting at the edge of the high-strength portion located adjacent to the one edge of the side wall and ending at the one edge of the side wall.

15. The structural member according to claim 1, wherein the structural member is curved to be convex on the top portion.

16. The structural member according claim 2, wherein the structural member is curved to be convex on the closing plate.

17. The structural member according to claim 1, wherein, as viewed along a cross section perpendicular to the direction in which the first ridge extends, at least part of an imaginary line segment connecting portions of the closing plate that are joined to the hat member or the grooved member is located between the top portion and the closing plate.

18. A structural member for a vehicle, the structural member being the structural member according to claim 1 mounted on the vehicle, wherein the top portion or the closing plate includes two connections separated by 6H or more as measured in the direction in which the first ridge extends and connected to another member.

19. The structural member according to claim 18, wherein the high-strength portion is located in a middle between the two connections.

* * * * *